(12) United States Patent
Paek

(10) Patent No.: US 10,578,748 B2
(45) Date of Patent: Mar. 3, 2020

(54) HIGH-PERFORMANCE TIME TRANSFER USING TIME REVERSAL (T3R)

(71) Applicant: Eung Gi Paek, Germantown, MD (US)

(72) Inventor: Eung Gi Paek, Germantown, MD (US)

(73) Assignee: Eung Gi Paek, Torrance, CA (US)

( * ) Notice: Subject to any disclaimer, the term of this patent is extended or adjusted under 35 U.S.C. 154(b) by 0 days.

(21) Appl. No.: 15/784,117

(22) Filed: Oct. 14, 2017

(65) Prior Publication Data

US 2018/0136339 A1    May 17, 2018

Related U.S. Application Data

(60) Provisional application No. 62/408,438, filed on Oct. 14, 2016.

(51) Int. Cl.
*G01S 19/44* (2010.01)
*G01S 19/29* (2010.01)
*G01S 19/21* (2010.01)
*G01S 19/22* (2010.01)

(52) U.S. Cl.
CPC ........... *G01S 19/44* (2013.01); *G01S 19/29* (2013.01); *G01S 19/215* (2013.01); *G01S 19/22* (2013.01)

(58) Field of Classification Search
None
See application file for complete search history.

(56) References Cited

U.S. PATENT DOCUMENTS

| | | | | |
|---|---|---|---|---|
| 5,552,878 A | * | 9/1996 | Dillard | G01C 3/08 342/135 |
| 8,264,397 B2 | * | 9/2012 | Paek | G01S 13/003 342/145 |
| 2014/0320335 A1 | * | 10/2014 | Lee | G01S 13/878 342/107 |
| 2017/0031032 A1 | * | 2/2017 | Garin | G01S 19/44 |

* cited by examiner

*Primary Examiner* — Daniel Swerdlow

(57) ABSTRACT

The basic concept of satellite-free time transfer using time reversal (T3R) has been invented and successfully demonstrated over long distance (about 4,000 km) with an accuracy of approximately 200 ns rms. The current invention describes new methods to drastically improve performance up to <10 ns rms—better than the current differential GPS, without satellites. The new method employs the Vernier concept utilizing the unique p-independence property of T3R irrespective of carrier frequencies. Also, a histogram method to automatically filter out extraneous data and allow high accuracy and a new method to extend the timing range of T3R beyond the pulse repetition period by removing ambiguity are proposed. A systematic way to obviate the signal blockage caused by transmit/receive window mismatch, is also proposed. Issues and solutions associated with the ionosphere are proposed, including 24-7 operation in adverse ionospheric conditions, such as the constantly changing ionosphere, multiple hops, static asymmetry, and jamming and spoofing.

12 Claims, 20 Drawing Sheets

FIG. 14
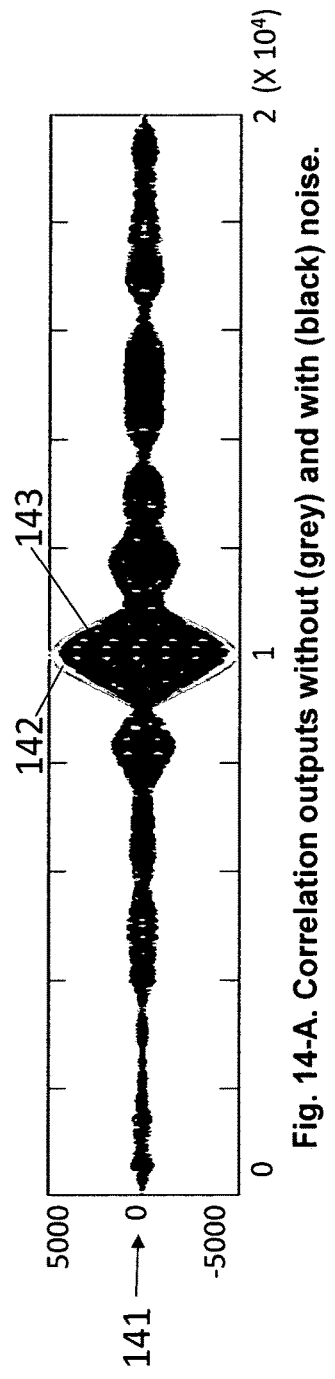
Fig. 14-A. Correlation outputs without (grey) and with (black) noise.
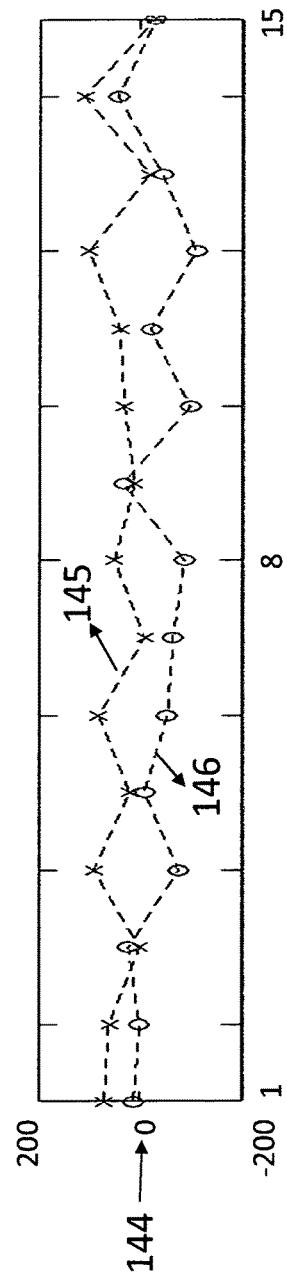
Fig. 14-B. Offsets of correlation peaks for f = 10 MHz (x) and 9 MHz (o)
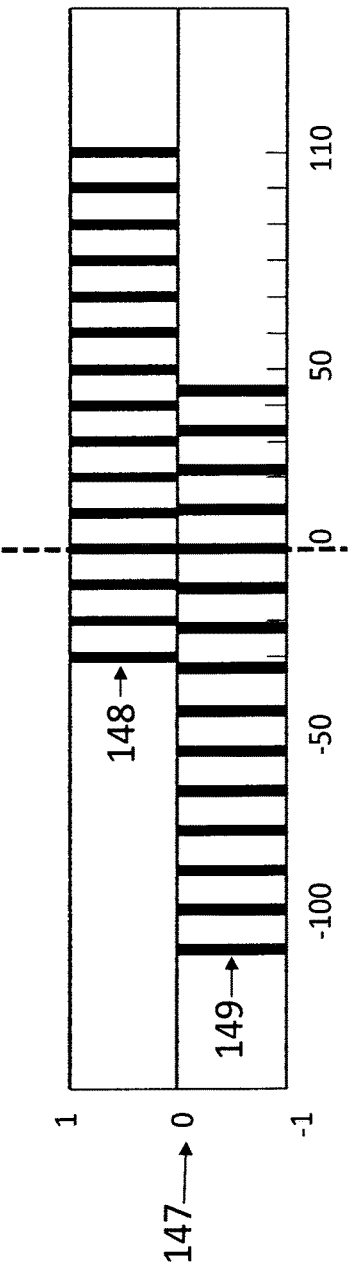
Fig. 14-C. Scales at f = 10 MHz (top) and 9 MHz (bottom)

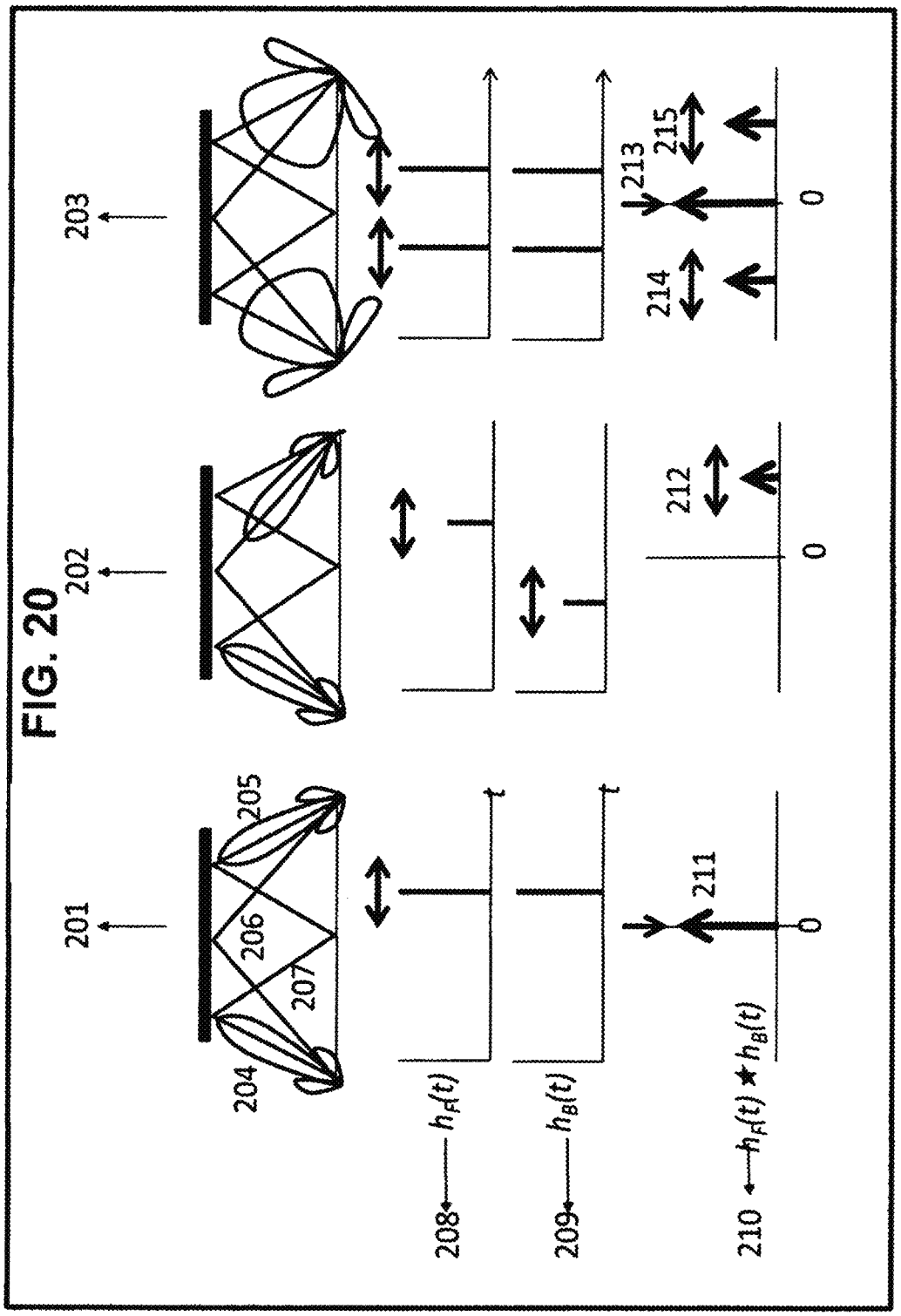

HIGH-PERFORMANCE TIME TRANSFER USING TIME REVERSAL (T3R)

STATEMENT REGARDING FEDERALLY SPONSORED RESEARCH OR DEVELOPMENT

An early portion of this invention leading to a coarse accuracy of 200 ns rms was made with Government support by DARPA-Strategic Technology Office.

CROSS-REFERENCES TO RELATED APPLICATIONS

The present application is related to U.S. provisional patent application (Application No. 62/408,438) filed on Oct. 14, 2016.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

Field of the Invention

The embodiments of the invention relate to systems and methods for transferring high-accuracy (<10 ns) time between two or multiple nodes over a long distance via the ionosphere, without using any satellites.

BRIEF DESCRIPTION OF THE SEVERAL VIEWS OF THE DRAWINGS

FIG. 14 shows a procedure to generate scales from correlation outputs.
FIG. 20 is a schematic diagram to show the effects of multiple hops, antenna radiation pattern, and pointing directions on correlation output.

DETAILED DESCRIPTION OF THE INVENTION

The basic concept of satellite-free Time Transfer using Time Reversal (T3R) has been invented (U.S. Pat. No. 8,264,397 B2, Paek et al.) and successfully demonstrated over a long distance (about 4,000 km) via the ionosphere with an accuracy of approximately 200 ns rms [Ref 1, 2]. The current invention is directed to methods and systems to substantially improve the accuracy up to 10 ns by combining various embodiments explained below.

Figure 1:
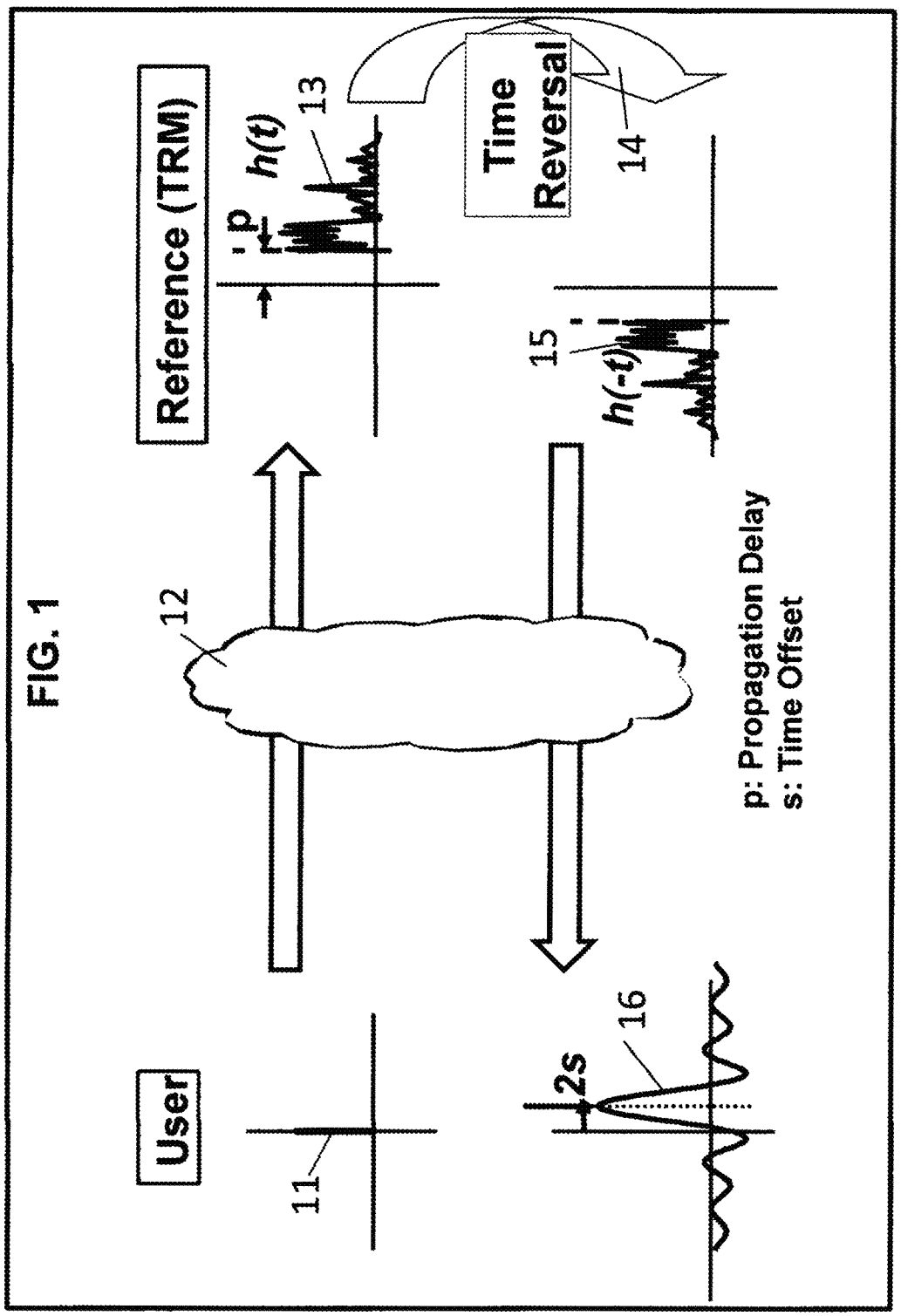
FIG. 1 is a schematic diagram of the time transfer using time reversal (T3R).

For the sake of completeness, the basic concept of the T3R will be briefly described below:

FIG. 1. Overview of the Time Transfer Using Time Reversal (T3R)

At first, User sends out a pulse 11 through a distorting media like the ionosphere 12, and Reference node receives the pulse after one-way propagation delay, "p". Due to multipaths, the received signal 13 is distorted to h(t), as shown in the Figure. It is difficult to locate the exact pulse position. This received signal h(t) is time-reversed 14 to h(−t) 15, and is retransmitted to User. If the propagating medium 12 is reciprocal, the signal User receives back 16 is given by the autocorrelation of h(t). As a result, the waveform is symmetric with respect to a unique peak 18. Therefore, one can identify and locate the peak location without ambiguity.

So, no coordination or data exchange is necessary, and the system has a high tolerance to multipath interference or other distortions. In fact, more multipaths will make the impulse response more complicated, and as a result, the autocorrection peak will become sharper. So, in fact, multipaths will help, rather than hurt in this case. Finally and probably the most importantly, the correlation peak appears at 2s, 18, independently of "p", as explained in FIG. 2.

Figure 2:
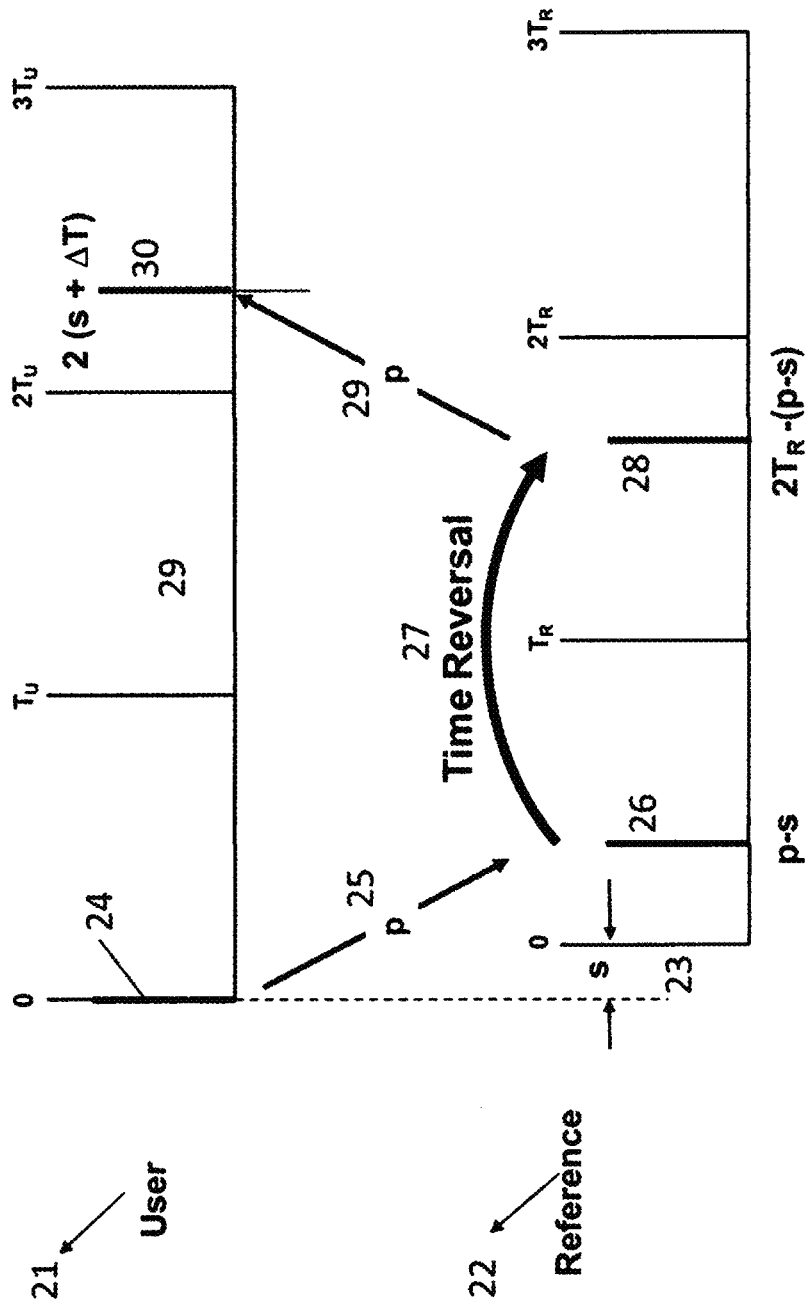
FIG. 2 shows the unique p-independence of the T3R.

FIG. 2. "p"-Independence of T3R

Let's assume that both user 21 and reference 22 nodes agreed to operate its node at a pre-defined period "T", e.g. 10 ms or 100 Hz pulse repetition frequency (PRF). The exact periods at both User and Reference nodes are denoted here as $T_U$ and $T_R$, respectively. Also, "p" 25 denotes the one-way propagation delay, and s 23 represents the desired time offset between the two nodes. At first, User sends out a pulse 24 at t=0 in User time. After p see, Reference node receives the pulse 26 at p−s in Reference time, which started s sec later 23. Or, one can say that the time offset of User node is −s seconds. The received signal is then time-reversed 27 to generate a pulse 28 at $2T_R$−(p−s) in Reference time. The signal is then retransmitted back to User. User receives the pulse 30 at $2T_R+2s$ in User time. Please note that User updates its frame every period $T_U$. Taking modulo "T", User sees the signal at $2T_R+2s-2T_U=2(T_R-T_U)+2s=2\Box T+2s$, where $\Box T=T_R-T_U$ denotes the difference in periods at the nodes. Assuming that $\Box T$ is sufficiently small, User node sees the returned signal at 2s—independently of propagation delay. This "p"-independence is the main concept of T3R.

Here we assumed that the difference in periods between the two nodes, $\Box T$, is sufficiently small. However, in reality, User's clock under test may not be perfect. Even though they agreed to 10 ms period, it could be 9.99 ms, for example. How would that affect "p" independence? Let's assume that the nominal period T=10 ms, and frequency accuracy of the User's modest clock is 1.E-8, the error becomes 0.1 ns, which is much smaller than GPS's accuracy of 20-100 ns. In our experiments, we used a low-cost ($1.5K) Rubidium clock with a frequency accuracy of 5E-11. In this case, the extra shift due to $\Box T$ becomes only 0.5 ps and thus negligible.

Ten technical issues of our previous invention on T3R and the new solutions in the current invention are summarized below in Table 1.

TABLE 1

Issues and solutions proposed in this invention.

| | Current Issues | Proposed Solutions |
|---|---|---|
| I | Poor accuracy, >200 ns rms error | Hidden carrier phase tracking and the Vernier method for <10 ns rms accuracy |
| II | Bad data rejection | Histogram for automatic discretion and rejection of bad data |
| III | Ambiguity in pulse repetition period | Vernier in pulse repetition interval (PRI) |
| IV | Signal blockage by T/R Switch | Four requirements and procedures for optimum selection of parameters |
| V | Poor SNR | Stroboscopic time-domain filtering and signal processing |
| VI | 24-7 operation | Swept Multiple Frequencies, dual-frequency antennas, and/or stable atomic clocks |
| VII | Ionospheric drift and non-reciprocity | Systematic analyses and requirements |
| VIII | Multiple Hops and antenna radiation pattern | "p"-independence and moving ionosphere |
| IX | Static asymmetry | Moving ionosphere with "p"-independence |
| X | Jamming and spoofing | Update waveform (frequency, bandwidth, prf) and stroboscopic filtering |

I. Propagation Delay ("p")-Independence of T3R in the Ionosphere

Figure 3:
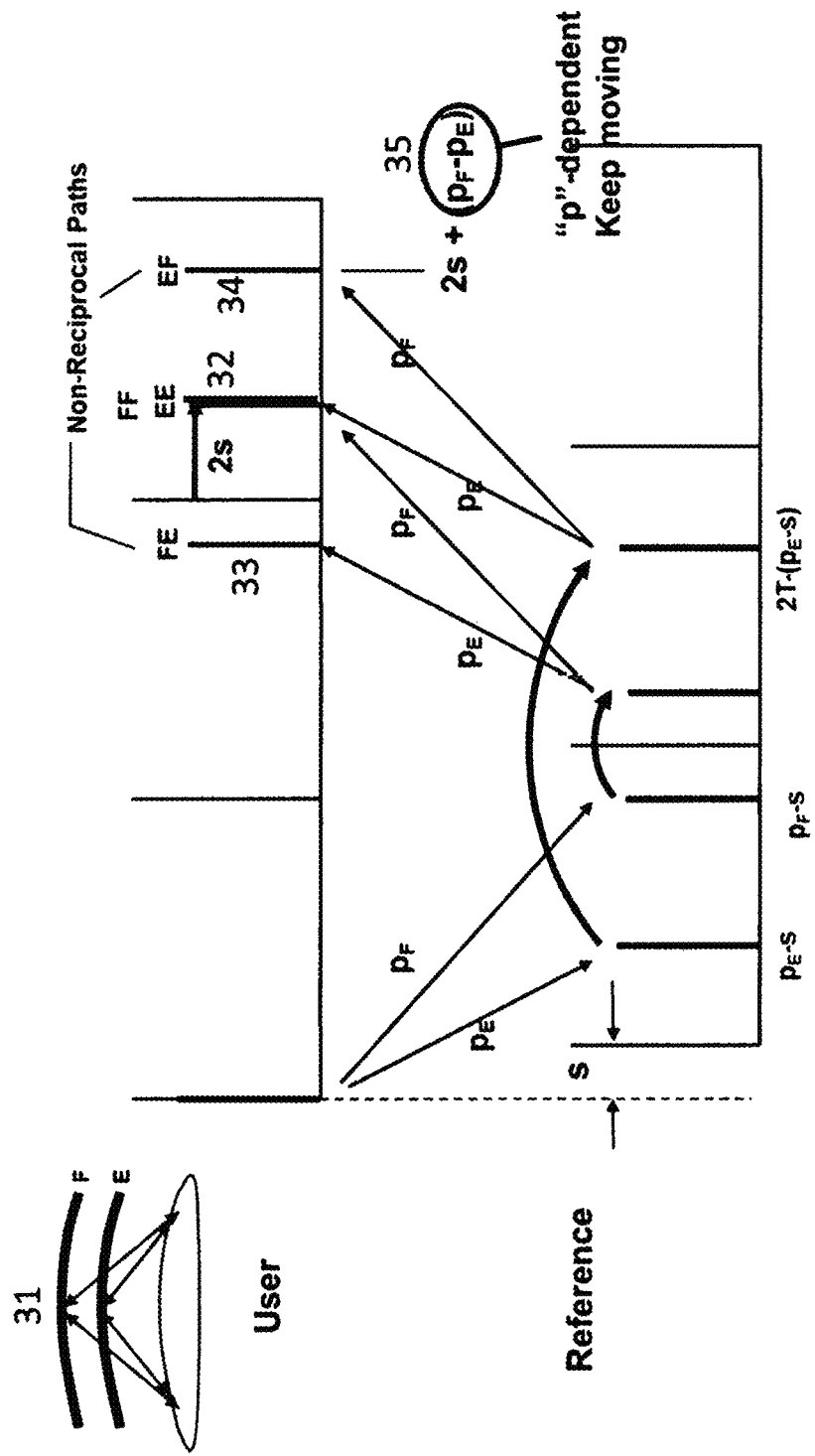
FIG. 3 shows the p-independence of the T3R in the ionosphere.

As shown in FIG. 3, the unique "p"-independence of the T3R can be applied to the ionosphere as well. The ionosphere consists of several layers (D, E, F1, F2). For brevity, let's consider only two layers—low E, and high F layers 31.

FIG. 3. "p"-Independence in the Ionosphere

Due to the "p"-independence, the returning time-reversed signals 32 through the same reciprocal (symmetric) path between in-bound (forward) and out-bound (reverse), denoted as E-E or F-F, will appear at 2s firmly even with the ionospheric turbulence. On the other hand, some signals, 33 and 34, will return via different paths, (E-F or F-E). These signals via non-reciprocal paths will not appear at 2s. For example, E-F signal will appear at $2s+(p_F-p_E)$, 35, which is "p"-dependent. As the layers move, the signal will move accordingly. Therefore, one can tell whether a two-way signal was obtained via reciprocal path or not.

Figure 4:
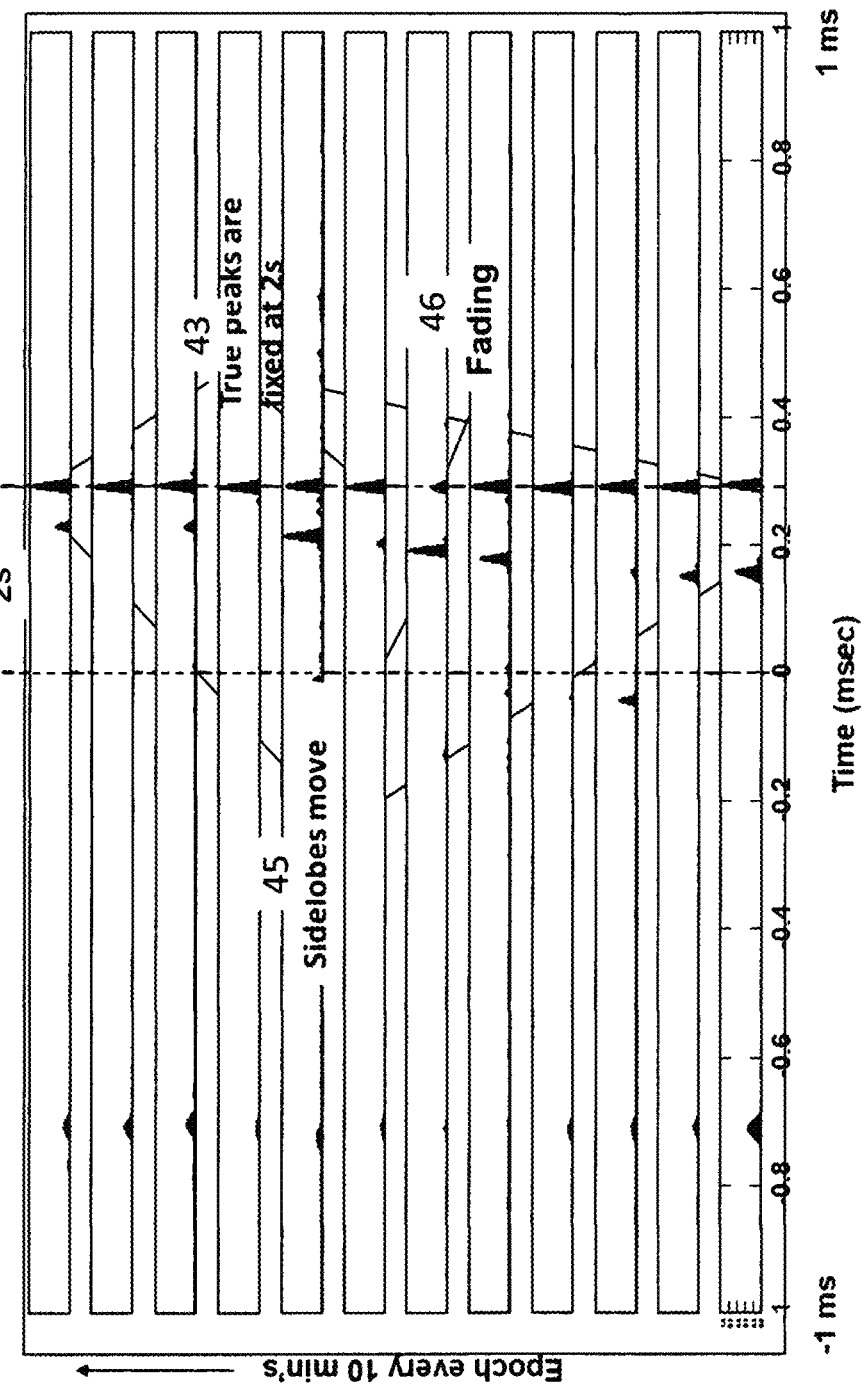
FIG. 4 illustrates typical ionospheric signals from T3R.

FIG. 4 shows an experimental example of the ionospheric T3R signals. Here the returning signal is traced every 10 mins, 41, 42, etc. covering 100 mins from bottom to top of the figure. One beauty of T3R is the desired peak 43 appears at 2"s", regardless of propagation delay. So, what you see is the desired time offset value. Owing to the unique p-independence, the correlation peak remains firmly at 2"s" for 100 minutes in spite of the ionospheric movement. On the other hand, the false peaks or sidelobes 45 via asymmetric paths keep moving. These extraneous sidelobes can be easily differentiated from the true peak and discarded after several epochs.

There has been a lot of skepticism about the effectiveness of time reversal in the ionosphere, which often causes bifurcation of signals. Also, the transfer functions of an antenna can be different between transmit and receive mode [Please refer to Ref 2 of Other Publications]. All these concerns can be nicely taken care of due to the unique p-independence feature of T3R, as clearly demonstrated in this experimental result.

FIG. 4. The Ionospheric Signals from T3R

II. Error Sources of the Ionospheric Signals

Figure 5:
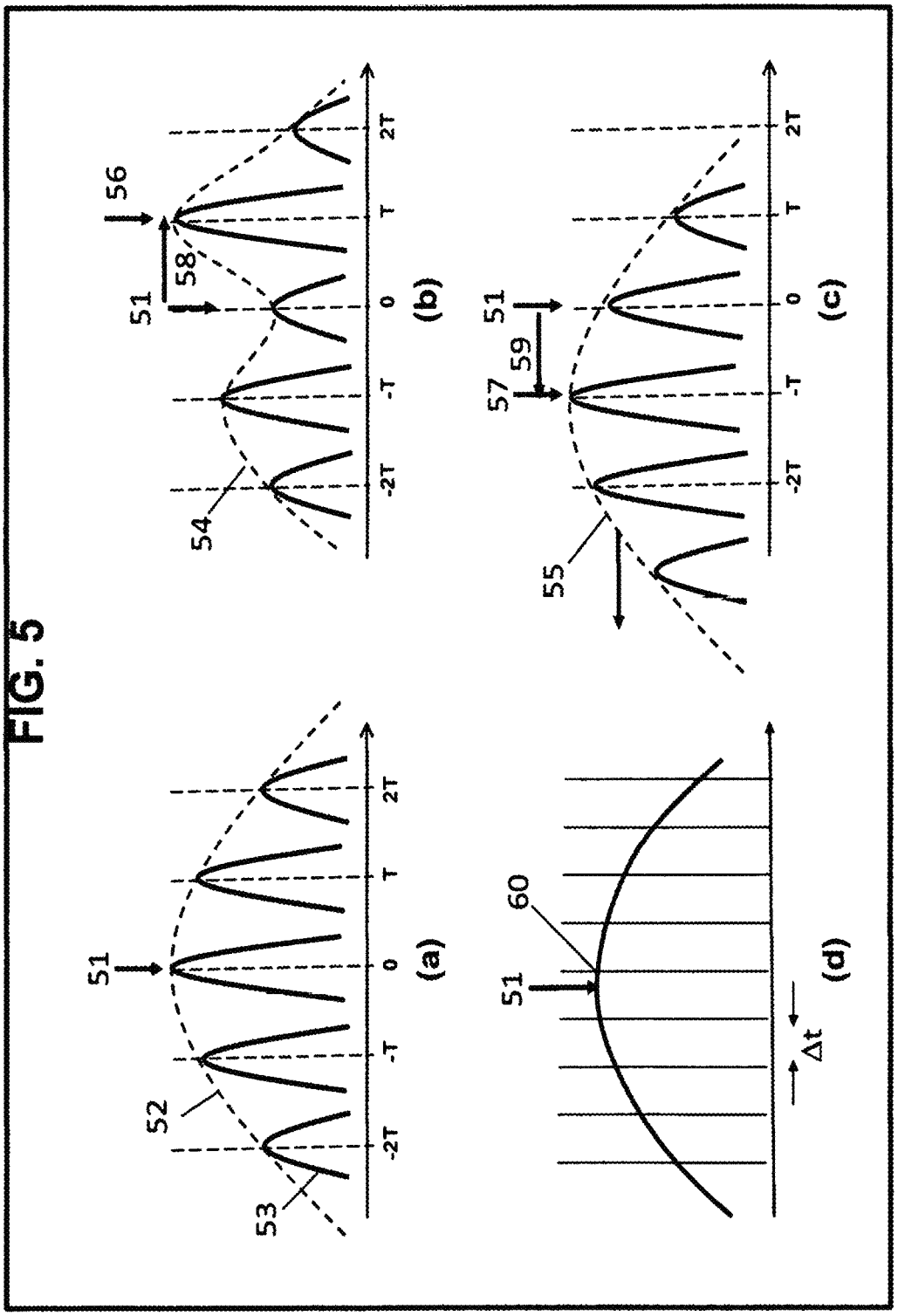
FIG. 5 shows typical error sources of T3R.

However, the accuracy of T3R using the envelope peak detection of the correlation output is limited for various reasons shown in FIG. 5.

FIG. 5. Typical Error Sources of T3R

When the system is not affected by any noise or dispersion, the correlation output from a T3R system looks like the one shown in FIG. 5(a). The sinusoidal carrier 53 is modulated by a sinc-shaped envelope 52, which is the autocorrelation of a linear FM signal. Therefore, the true peak position 51 can be uniquely identified. However, when the system is exposed to noise, the envelope 54 can be distorted as in FIG. 5(b) or entire envelope can be shifted 55 as in FIG. 5(c), leading to wrong peaks 56 and 57, causing an error 58 or 59, respectively offset from the true peak 51. Besides, as shown in FIG. 5(d), the finite sampling interval $\Box t$ during the digitization of a signal can often miss the true peak 51 and lead to an erroneous peak 60.

It should be noted that envelopes 52, 54, 55 in FIG. 5 is very susceptible to external noise, while carrier phase 53 is very stable. The envelope has a broad frequency spectrum covering the entire bandwidth of a linear FM (100 KHz, e.g.). All the noise components within the spectral bandwidth contribute to distorting the envelope. On the other hand, the carrier has a single frequency component, which is the center frequency of the linear FM. Out of the broad spectrum, only the single frequency component in noise will affect the carrier, warranting a stable carrier against noise.

III. High-Precision Phase Tracking Using Hidden Carrier

Figure 6:
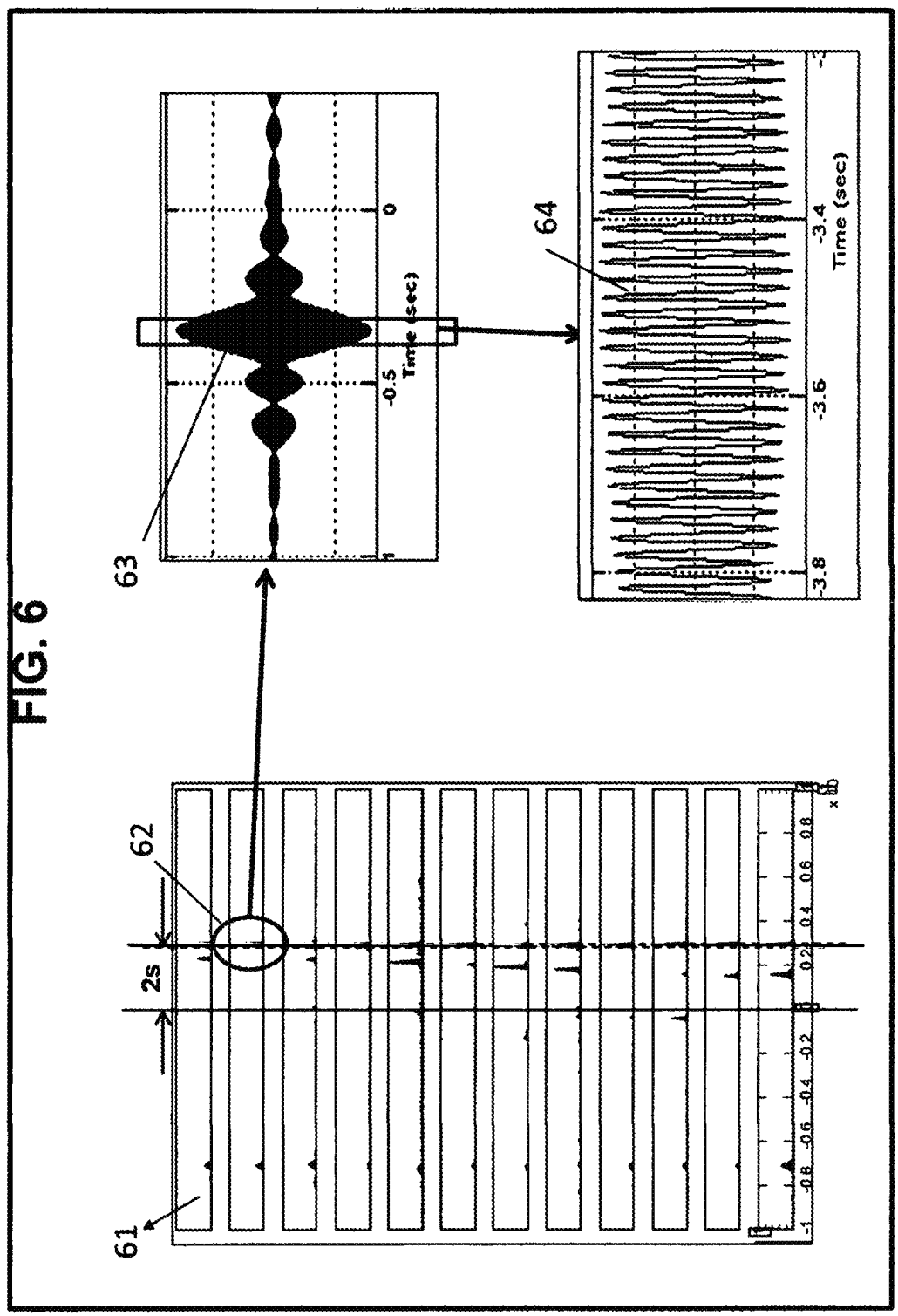
FIG. 6 indicates that the correlation peak has carrier in it.

FIG. 6 shows a magnified view 61 of the ionospheric correlation output shown in FIG. 4. Looking closely, the correlation peak 62 consists of a sinc-shaped envelope 63, which is modulated by a sinusoidal carrier signal 64.

FIG. 6. Correlation Peak has Carrier in it

Figure 7:
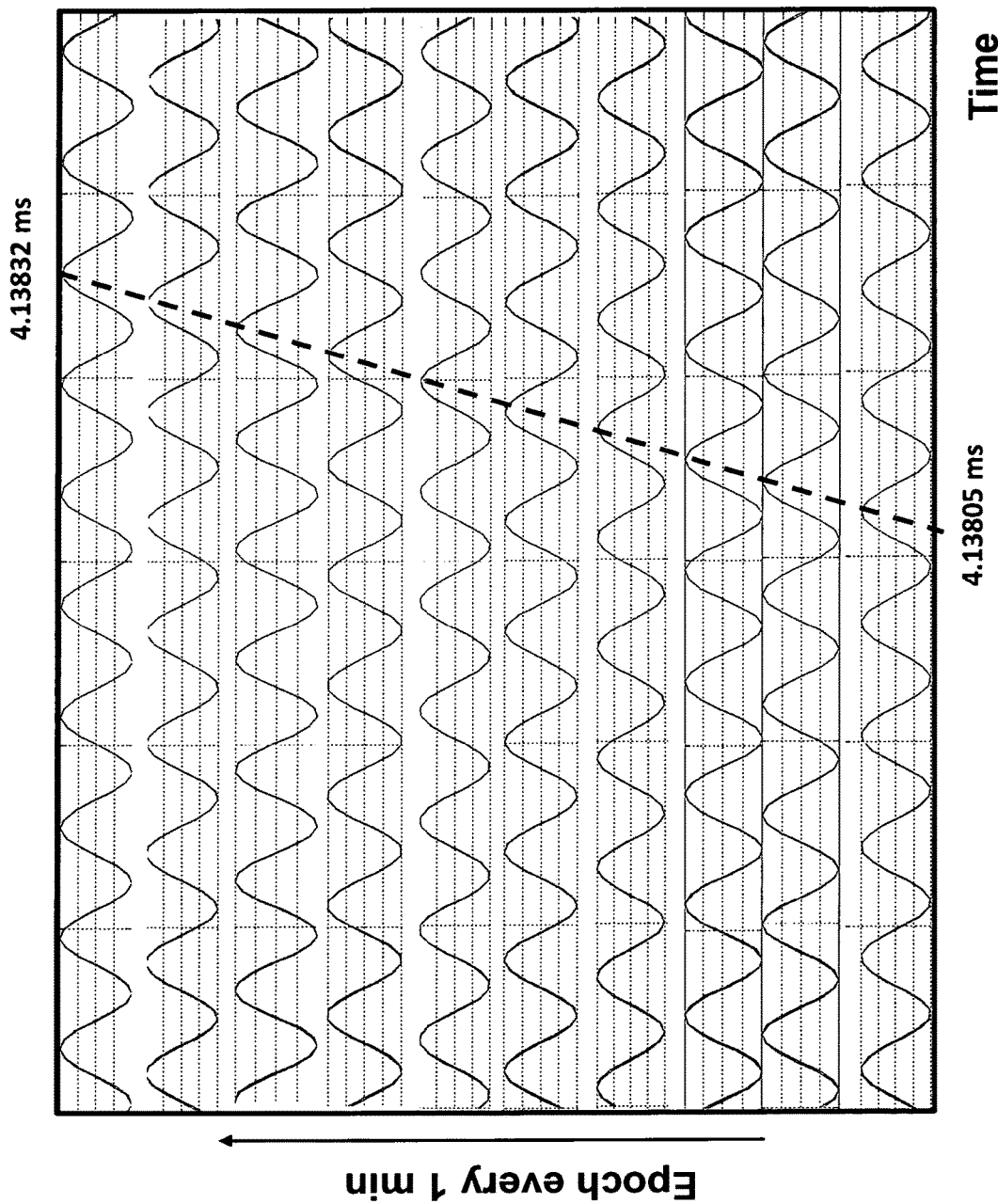
FIG. 7 demonstrates a precise phase tracking result through the ionosphere.

FIG. 7 demonstrates an experimental result of tracking the phase of the carrier signal after transmission through the ionosphere. Each epoch is measured every minute with a total tracking time of 10 minutes. One can clearly see that the phase is very stable with a slope of 5.0E-10, which is consistent with the separately measured time offset between the Rubidium clocks at both nodes. In a series of separate experiments, an rms precision error of less than 10 ns for several hours has been routinely observed.

FIG. 7. An Experimental Phase Tracking in the Ionosphere

These experimental results show a great potential to achieve high precision time transfer via the ionosphere. The stability of the phase tracking in the ionosphere is owing to the unique "p"-independence of T3R, irrespective of frequencies (dispersion compensation) and phase distortion, which are, in turn, based on reciprocity. Therefore, a special care must be taken not to lose reciprocity as follows:

The phase of the carrier must be measured "near" the true peak where paths were reciprocal and thus p-independence works. As explained in FIG. 3, the signals via asymmetric paths will appear off the desired true peak. If phase is tracked away from the true peak, stable phase tracking cannot be obtained. It does not require "exact" true peak location, which is not available and is the whole purpose of this work. Instead, the offset within several carrier periods would suffice to obtain a stable phase tracking. This can be easily done with a coarse peak detection.

The latency time at TRM must be minimized to avoid a significant amount of ionospheric change, which causes non-reciprocity. To reduce the latency time required to generate a time reversed waveform, a fast processor like an Field Programmable Gate Array (FPGA) is essential. The amount of the ionospheric drift can be estimated using the formula described in FIG. 19.

IV. The Vernier Method for the Ionospheric Signals

In order to utilize the stable carrier phase against noise and to obtain high precision and high accuracy from the T3R system, the vernier method is proposed in this invention. A vernier consists of two graduation scales—main data scale and the secondary indicating scale. The secondary scale has its graduations at a slightly different (usually smaller) spacing than those on the main data scale. This permits none but the last graduation coincide with any graduations on the data scale.

Figure 8:
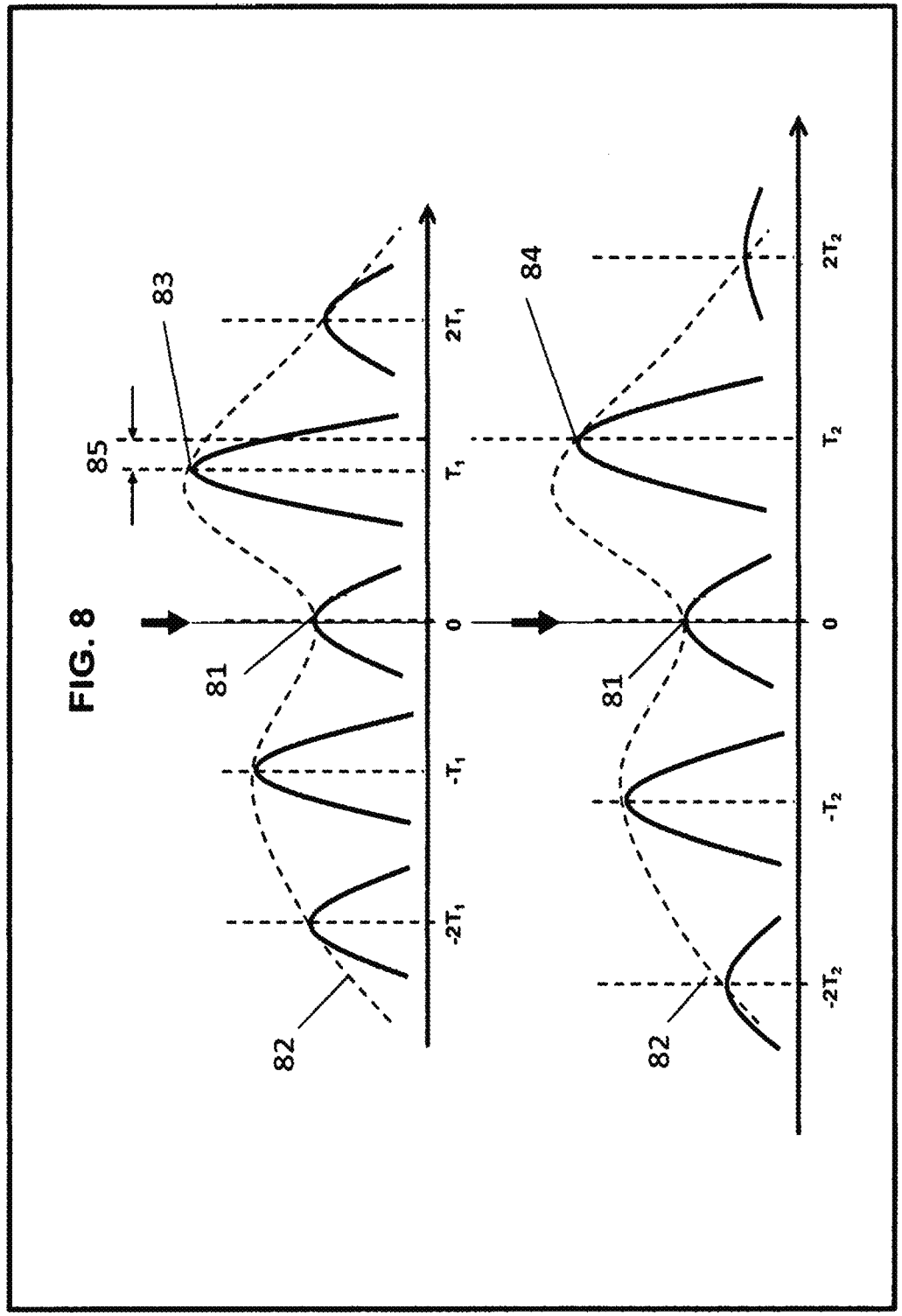
FIG. 8 is a schematic diagram of the vernier method to find a true peak using two frequencies

FIG. 8. Vernier to Find a True Peak Using Two Carrier Frequencies in T3R

IV-1. Procedure of the Vernier Method

Figure 9:
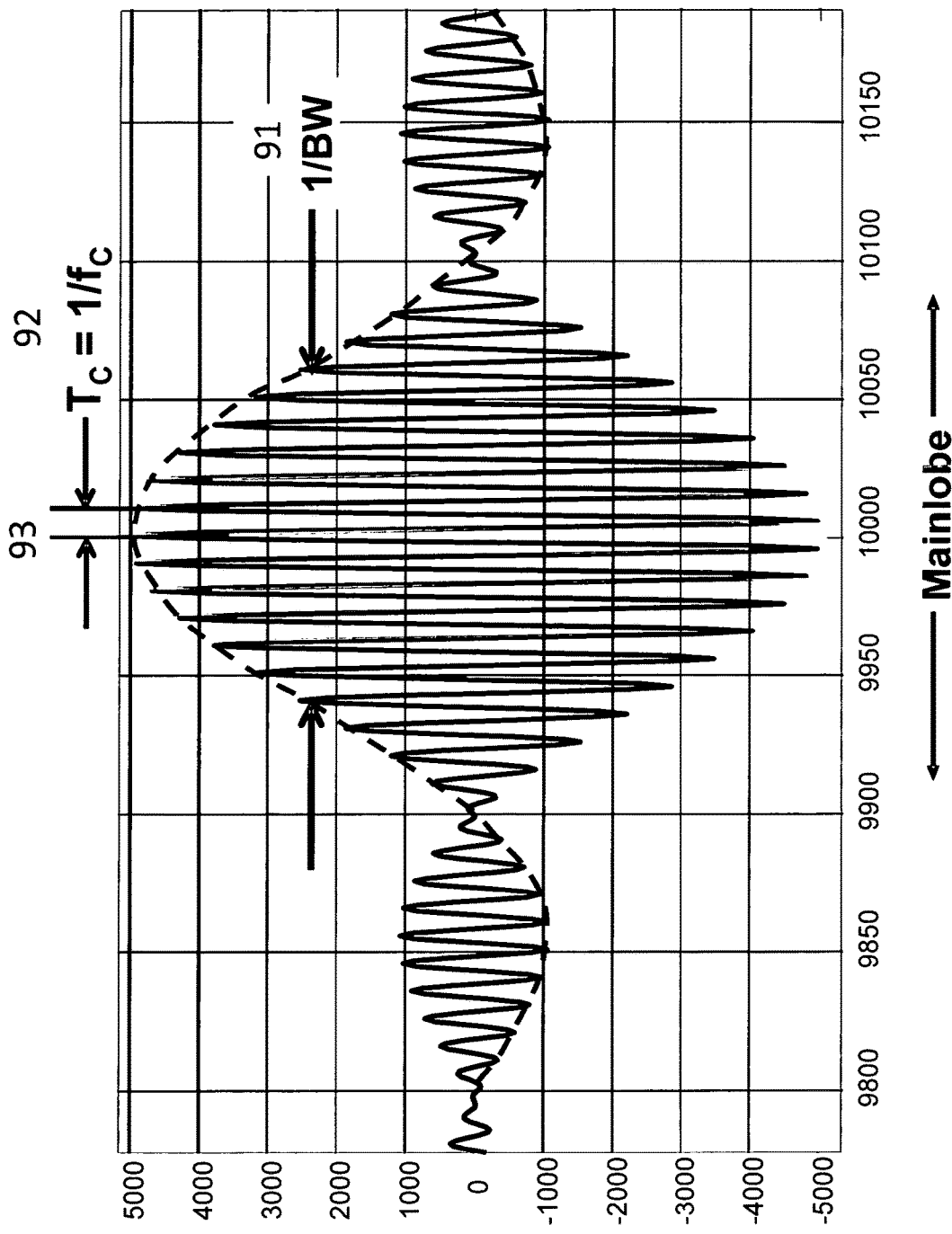
FIG. 9 shows a correlation output with a sinc-shaped envelope modulated by a carrier signal
FIG. 10 describes a process for carrier peak detection.

In these embodiments, we used a linear FM as a reference signal, and the pulse compression technique is used in order to increase signal-to-noise ratio (SNR) in a highly noisy environment. As shown in FIG. 9, the correlation output from T3R without noise is approximately given by $$\text{sinc}(BW \cdot t) \times \cos(2\pi f_C t + \varphi),$$

where BW is the bandwidth 91, and $f_C$ 92 is the center frequency of the linear FM. The mainlobe of the sinc-shaped envelope has a width of 1/BW. The envelope is modulated by a constant frequency, which is the center frequency of the linear FM. Within the main lobe, the phase $\varphi$ of the carrier remains constant, and the central peak 93 of the carrier coincides with that of the envelope.

FIG. 9. Correlation Output with Sinc Envelope Modulated by a Carrier

However, with noise, the neighboring peaks can be stronger, causing errors in peak detection. Such noise-induced ambiguity can be removed using Vernier as follows:

IV-2. Detection of the Carrier Peaks

The locations of the carrier peaks 102, 103 of a correlation output 101 can be found one by one using the simple peak detection. In the example shown in FIG. 10, we want to find the carrier peaks, $P_1$ and $P_2$. After finding first peak P1 103 using the usual peak detection, it is necessary to null out neighboring time elements 105 to ensure that subsequent peaks are searched beyond the neighbors separated by more than half the period $t_C$ 104. So, all the neighboring time elements within $+-t_C/2$ are nulled out 105 to allow the second peak detection process to find $P_2$, instead of the first peaks' neighbors A or B, which is stronger than the desired second peak $P_2$. This process is repeated until all the carrier peaks within the main lobe are found.

Figure 10:
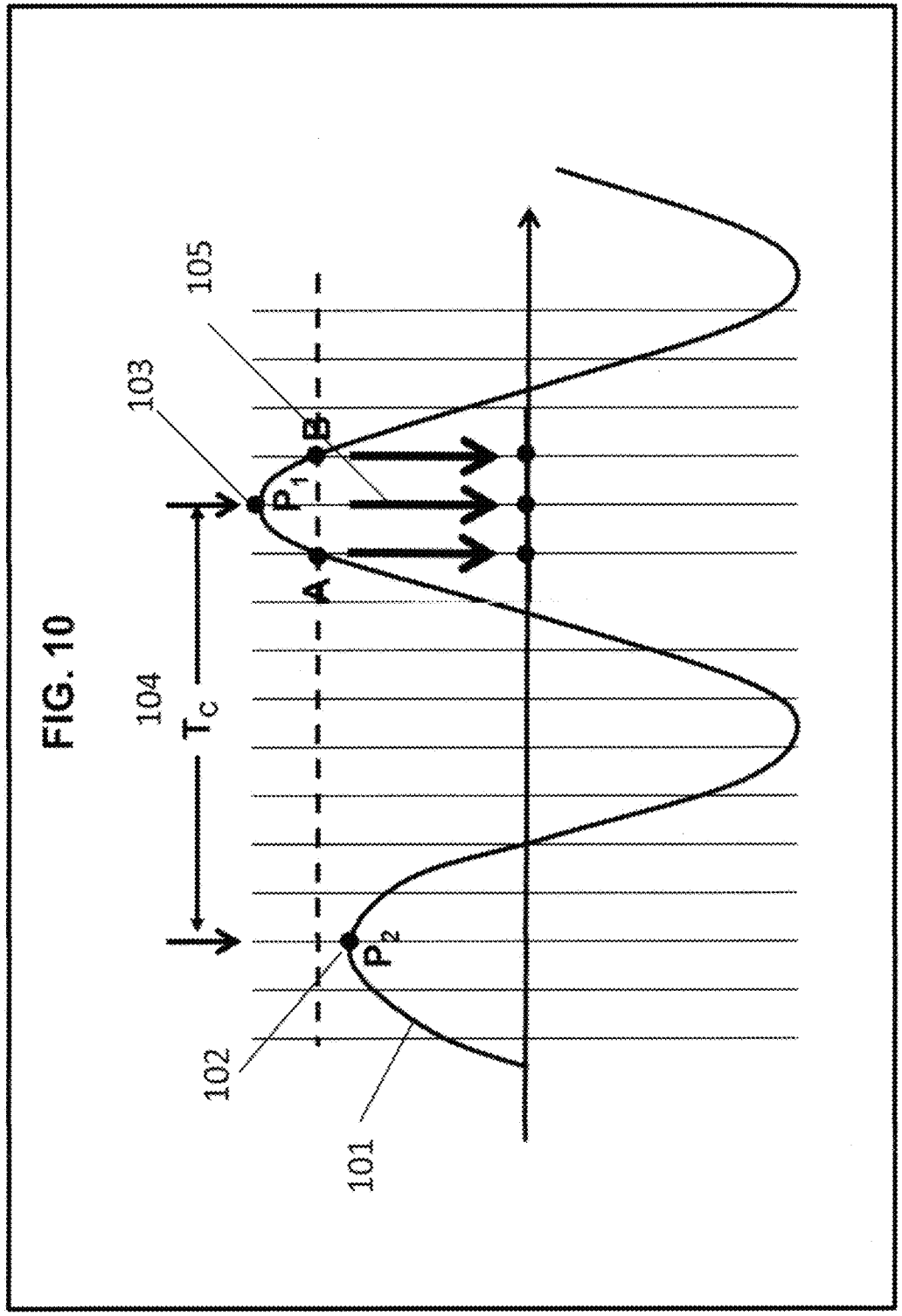

FIG. 10. Carrier Peak Detection

IV-3. Scale Generation

Figure 11:
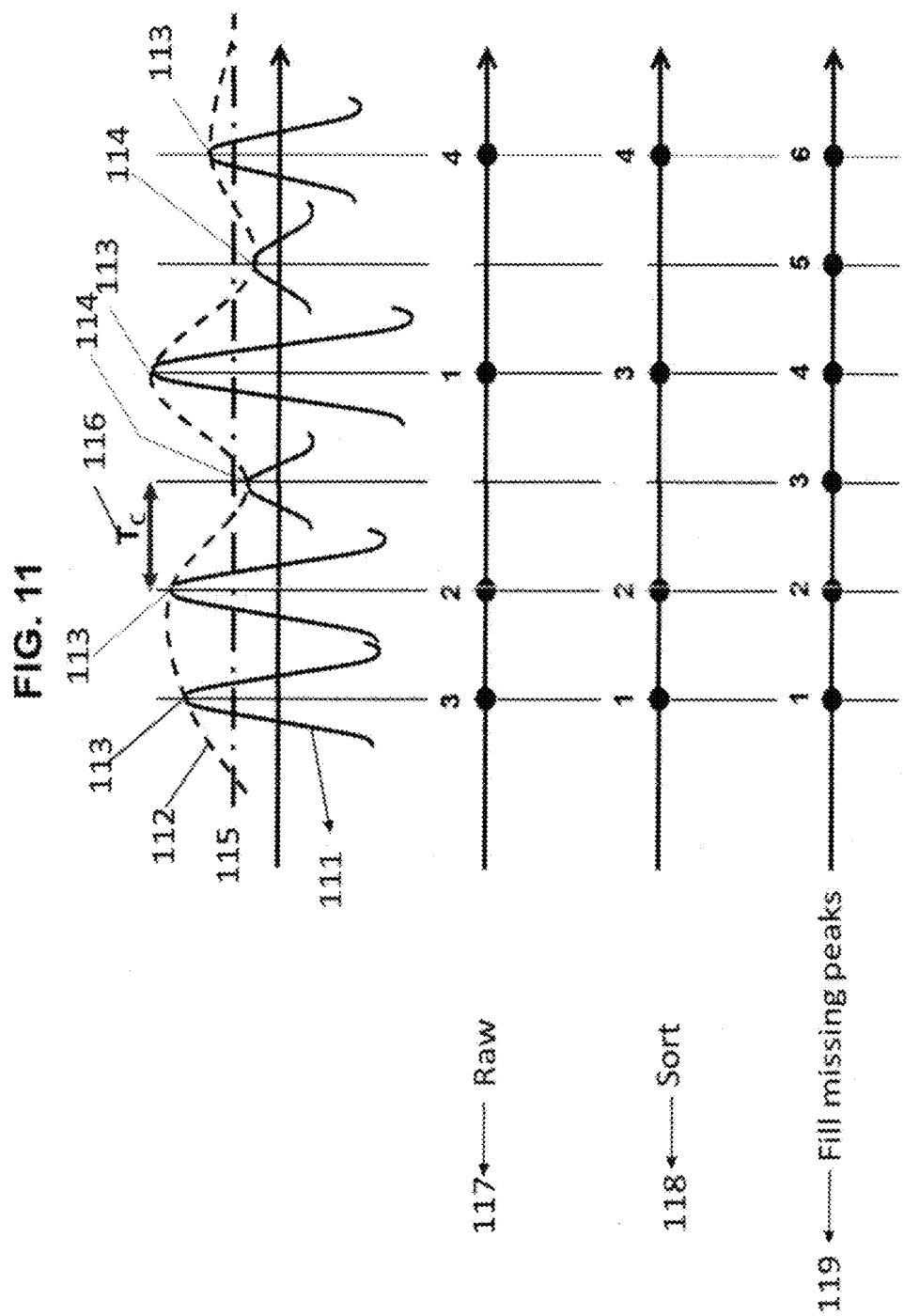
FIG. 11 explains how to generate a scale from correlation carrier peaks.

The procedure to generate a scale from a correlation output with carrier modulation 111 is shown in FIG. 11. When noise is high, the envelope 112 can be distorted too much for peak detection to find a correct true peak. Here, the carrier peaks 113 can be found using the procedure described above and is shown in the raw data 117. Some peaks such as 114 are below the threshold 115 and are lost. Also, the quantization noise due to the finite sampling interval can cause an error in peak detection, which often can be significant. However, we already know that the carrier peaks 113 are equally separated by the carrier period $t_C=1/f_C$ 116. What we want to find is simply the phase of the carrier. Therefore, using a simple procedure such as the sorting 118 and the curve fit to a linear equation to find the lost peaks 114, a desired scale 119 can be generated.

FIG. 11. Scale Generation from Correlation Carrier Peaks

IV-4. Vernier with Two Frequencies

Figure 12:
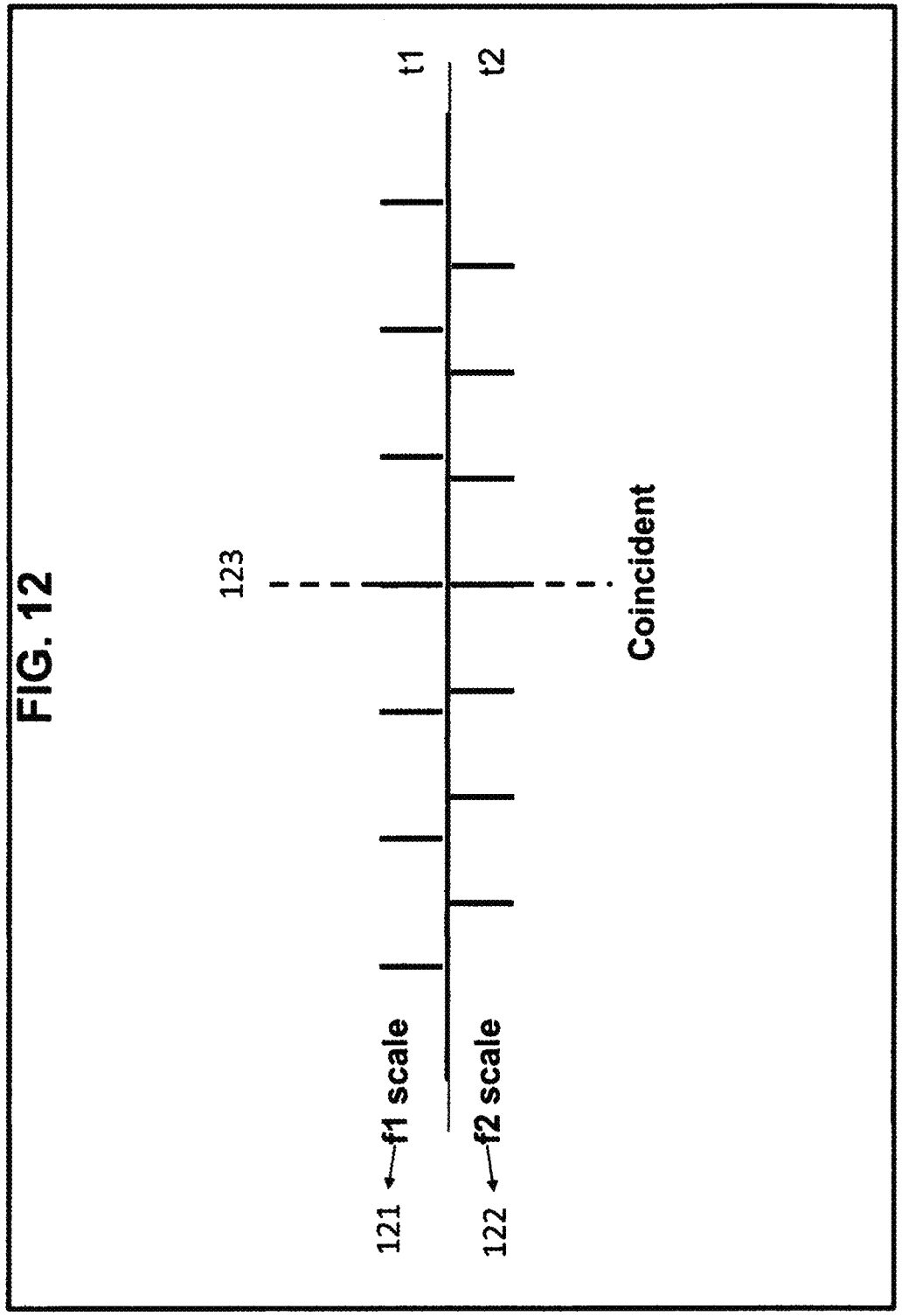
FIG. 12 shows a method to find intersections from vernier.

Likewise, the second scale 122 can be obtained using the second frequency f2. As shown in FIG. 12, both scales 121 (same as 118), 122 intersect at the desired true offset 123 even with noise, as mentioned before. Such intersect can be easily found using MatLab command "intersect", or equivalent.

FIG. 12. Vernier Intersection

Figure 13:
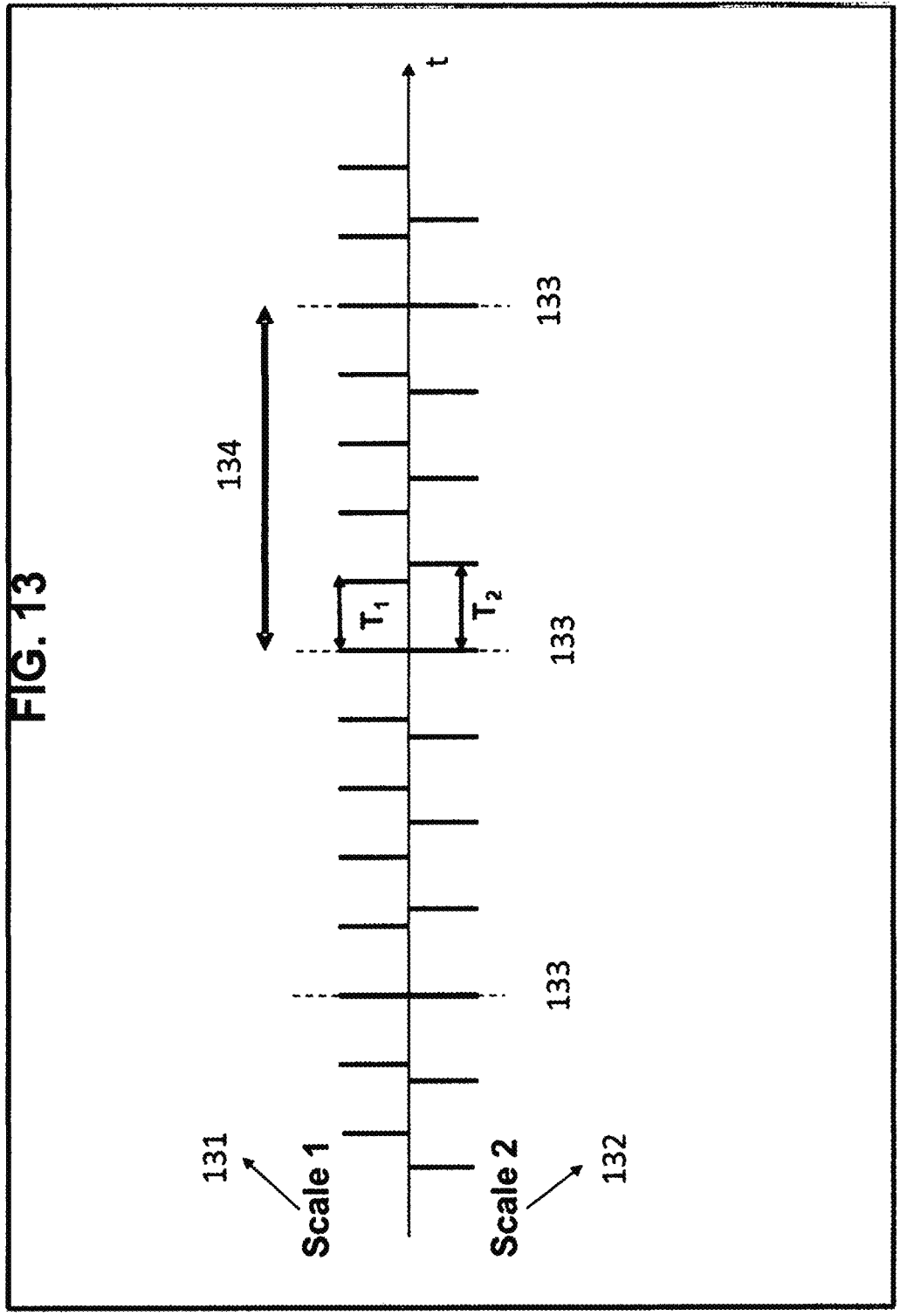
FIG. 13 explains Free Temporal Range (FTR).

As shown in FIG. 13, these intersect 133 repeats every free temporal range (FTR) 134, which is given by $$FTR = LCM(T_1, T_2) = \frac{|T_1, T_2|}{GCD(T_1, T_2)},$$

where LCM denotes the least common multiplier, and GCD is the greatest common denominator. By adjusting and selecting frequencies and as a result, T's properly, one can increase FTR beyond the search range. Or, more than two frequencies may be used to increase the accuracy, if needed.

FIG. 13. Free Temporal Range (FTR)

IV-5. Requirements of the Vernier

To use the Vernier concept with T3R, the intersection of the two scales must appear at the desired true peak location, regardless of propagation delays, frequencies, and time offset. This means that dispersion effects due to the ionosphere and the components, such as antennas, bandpass filters, FPGA, and amplifiers, must be completely canceled out after time reversal and round trip.

As mentioned earlier, all orders of the dispersion caused along the symmetric path (the ionosphere, antenna) can be faithfully compensated by time reversal processing and subsequent round trip. However, the components in the asymmetric path, such as FPGAs, bandpass filters, and amplifiers, can cause un-compensated dispersion effects. The amounts of these dispersion are usually fixed and reproducible and so can be individually calibrated out by elaborate calibration procedures.

V. Histogram Filtering with Vernier

Even with the Vernier method, T3R can still lead to errors due to extraneous noise (receiver, quantization, etc.) or higher orders beyond the free temporal range. However, the sinc-shaped envelope will force the trend so that the peak appears at the desired true offset with the highest probability. Also, moving average can smooth out the noise effects and reveal the sinc-shaped envelope and thus a true peak. However, this usually requires a long averaging time. Further, the averaging cannot completely remove non-uniform color noise.

In this invention, we propose a new histogram method to count the occurrences of data statistically and automatically filter out bad data using the fact that true data can occur with higher probability than false ones. In the following, a detailed procedure and the programs to simulate the combined Vernier-Histogram filtering will be presented with the performance results.

V-1. Flowchart to Simulate the Vernier-Histogram Filtering

Table 2 shows a framework of the program to simulate the proposed Vernier-Histogram filtering method with T3R.

[STEP 4] Total signal received by a receiver is the sum of signal and noise.

[STEP 5] Correlation: the received total signal is correlated with the original reference signal using a MatLab command correla=xcorr(signal, ref). The length of the correla is 2*N−1 and its central peak appears at index=N when true offset is 0.

[STEP 6] Carrier peaks detection: several (~10-20) carrier peaks of the correlation output are found using a subroutine, sub_FindCarrierPeaks.m after sorting, gap filling, and curve fit procedure.

[STEP 7] Scale-1 generation for fCenter1: the time locations of the carrier peaks are used to generate SCALE-1.

[STEP 8] Scale-2 generation for fCenter2: The above procedures 1-7 are repeated for the second frequency, fCenter2, to obtain Scale-2.

[STEP 9] Vernier of Scale-1 and Scale-2: Find the "intersect" of Scale-1 and Scale-2.

[STEP-10] Histogram: The above procedures 1-9 are repeated for epochs with different noise seed numbers. Then find the count value when the corresponding intersect value occurs most frequently.

V-2. Main and Sub Programs to Simulate the Vernier-Histogram Filtering Method

Table 3 lists the programs created to evaluate the performances of the Vernier and Histo-Filtering methods. It consists of a main code called main_VernierHisto, five subroutunes, and two plotting programs. The purpose of each program is briefly described in the Table.

TABLE 2

A framework of the program for the Vernier-Histogram Filtering.

```
for itSeed = 1:10                              % for random seed
  rng(itSeed);
  noise(itSeed, t) = ampNoise*randn(1,N);      % Noise
  % Generate two Scales from correlations at f1 and f2
  for itFreq = 1:2;                            % for two freq's
    ref(t) = chirp(t, f1, t2, f2);             % Ref LFM signal
    signal(t) = ref(t-tTO) + noise(itSeed, t); % Signal, shift ref by tTO and add noise
    correla(t) = xcorr(signal(t), ref(t));     % correlation
    tCP(itFreq) = find M t's at correlation peaks, tCPk(m), m = 1:M
  end
  % Vernier : find "intersect" of the two scales, tCP(1) and tCP(2)
  tIntersectVsSeed(itSeed) = sub_Vernier(tCPF(1), tCPF(2));
end
% Histogram: Find most frequent "tIntersect"
[tHistoMax, nbins] = sub_Histo(tIntersectVsSeed);
% error from trueOffset value
tHistoError = tHistoMax − tTO;
```

In the following, ten steps to perform the Vernier-histogram filtering are described.

[STEP 1] Reference signal generation: At a given center frequency (fCenter), bandwidth (BW), and pulsewidth, a chirp signal with a length N is generated using a MatLab command chirp(t, f1, t2, f2), where t is an array of time, t2 is final time, f1 and f2 are initial and final frequencies, respectively.

[STEP 2] Signal generation: signal is a reference signal which is shifted by timeoffset (tTO).

[STEP 3] Noise generation: For a given seed number (and a MatLab command rng(seednumber)) and noise amplitude (ampNoise), noise signal is generated using a command noise=ampNoise*randn(1:N).

TABLE 3

Programs to simulate the proposed Vernier histogram filtering method.

| Program | Purpose |
| --- | --- |
| main_VernierHisto | Main code to find the true time offset value using the proposed Vernier and Histogram Filtering |
| sub_RefLFM | Generate a linear FM to be used as a reference signal |
| sub_FindCarrierPeaks | Find M carrier peaks from a correlation output of a LFM and form a scale with equal spacing |
| sub_Vernier | Find the intersect of two scales and |

TABLE 3-continued

Programs to simulate the proposed Vernier histogram filtering method.

| Program | Purpose |
| --- | --- |
| sub_HistoFilter | discard bad data<br>Find the most frequently obtained time offset value |
| sub_SNR | Estimate QoS (quality of signal) of correlation output |
| sub_Fig1_VernierScales | Plot correlation, its peak indices, and Vernier scales |
| sub_Fig2_Histo | Plot histogram of the Vernier results |

V-3. Input Parameters and Test Conditions

Table 4 shows the key parameters and their values used in this simulation.

TABLE 4

Input parameters and test conditions.

| Parameter | Value |
| --- | --- |
| Center frequencies | f1 = 10 MHz and f2 = 9 MHz |
| Bandwidth (BW) | BW = 100 KHz |
| Amplitude of noise vs signal | ampNoise = 15 |
| Signal-to-noise ratio | SNR = −23.5 dB |
| Sampling rate of oscilloscope | SR = 100 MS/s, or 10 ns/div |
| Sample length | N = 10,000 + 1 |
| Size of correlation | 2*N − 1 = 20001 with a peak at n = N |
| Free temporal range | FTR = 1,000 ns |
| True time offset | tTO = 30 ns, index = N + tTO*SR = 10,004 |

V-4. Generation of Scales from Correlation Output

FIG. 14 shows correlation output 141, its carrier peaks 144, and the resultant scales 147 generated with two different center frequencies, 9 MHz and 10 MHz.

FIG. 14. Generation of Scales from Correlation Outputs

Top FIG. 141 shows the correlation outputs for single center frequency f1 when amplitude of noise is 0 (shown in 142) and 10 times stronger than that of signal (SN1Z=−20 dB, shown in 143), respectively. The horizontal axis represents time sampled at an index ranging from 1 to 2*N−1, where N is the total number of timing sample points of a reference signal. When noise is absent, correlation output 142 peaks at the index of true offset, indTO. When noise is present, the envelope of the correlation 143 is distorted and shifted.

Middle FIG. 144 shows the timing indices m at which carrier peaks occur, counted from true offset index (indTO) at two different center frequencies, f1=10 MHz (shown in 145) and f2=9 MHz (shown in 146).

Bottom FIG. 147 shows the two scales 148 and 149 generated at both frequencies. One can see that both scales intersect at the fourth division of Scale 1 (or 11th division of Scale 2) 150, counting from left, exactly at the trueoffset, indTO, resulting in a zero error.

V-5. Histogram Filtering

Figure 15:
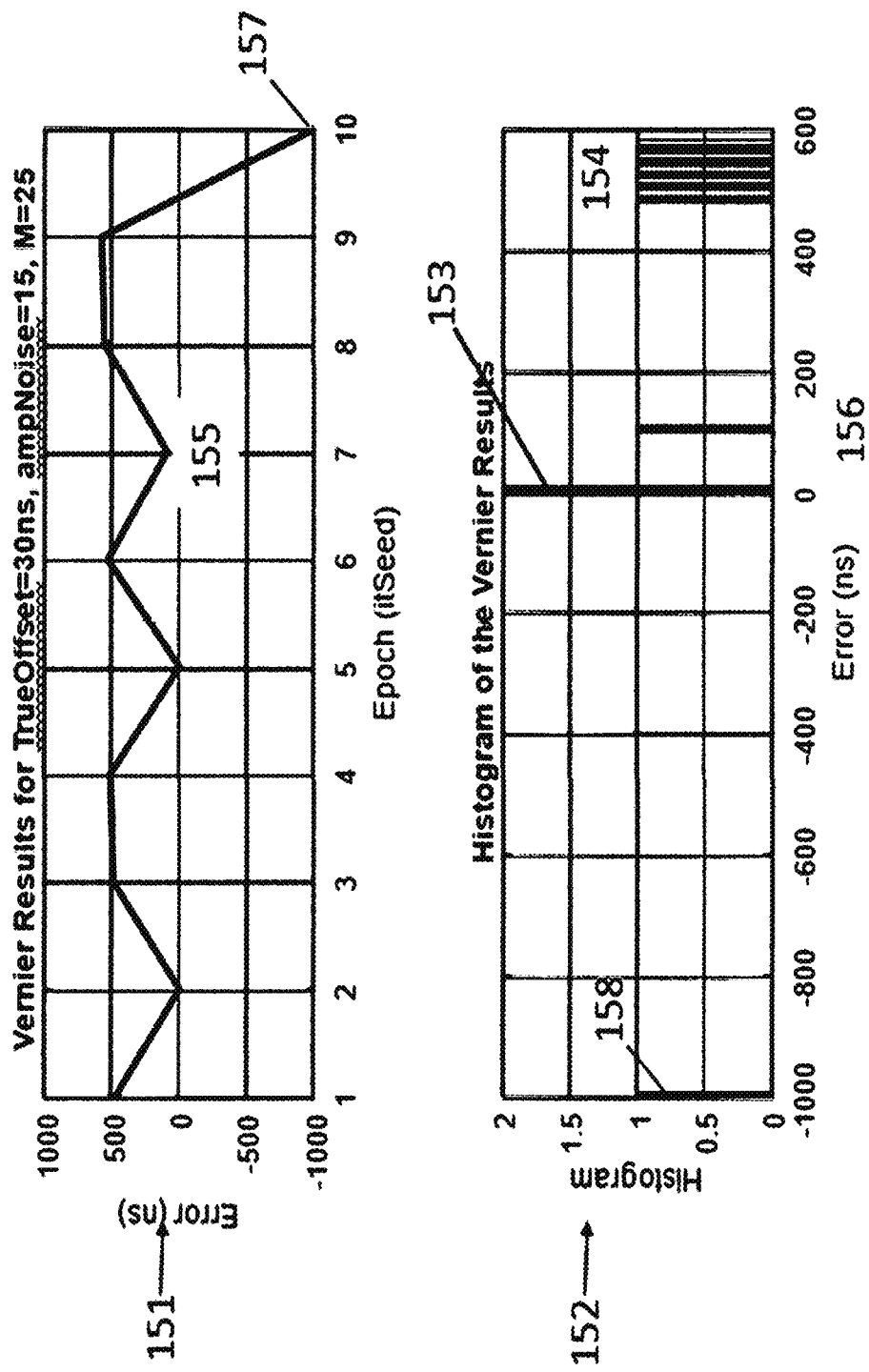
FIG. 15 shows a result from histogram filtering.

A simulation result of the histogram filtering is illustrated in FIG. 15.

FIG. 15. Histogram Filtering

The top FIG. 151, in the Figure shows the errors as a function of epoch number after using the vernier method. At each epoch, the seed number is varied to generate a different set of random noise. The center carrier frequencies (or periods) used to generate two Vernier scales are f1=10 MHz and f2=9 MHz (or T1=100 ns and T2=1000/9 ns). The resultant FTR is 1000 ns. The SNR of the signal is −23.5 dB (1/15 in amplitude), and the number of selected carrier peaks, M=25. The desired true offset value is at 30 ns.

The bottom FIG. 152 shows a result of the histogram filtering as a function of error. Two epochs (epoch numbers 2, 5) out of ten epochs yield correct time offset with 0 error with highest probability 153.

When noise is too strong like the current case of SNR=−23.5 dB, the intersect of the two scales often may not exist within the search range. In these cases, outputs are arbitrarily assigned among improbable values between the grid separated by T. In order to lower the histogram values for the bad cases, the assigned values are uniformly distributed, such as 48, 50, 52, etc., near T/2 154.

The error of 100 ns at epoch number 7 (155 and 156), is attributed to the first neighboring carrier peak, which is separated from the true peak by $1/f_C$.

The error of −1000 ns at epoch number 10 (157 and 158) is attributed to the first higher order, which is separated from the true peak by FTR.

In this way, the bad raw data can be automatically removed without having to identify the origin of the error sources, simply based on the "intersect" estimates.

V-6. Performances of the Combined Vernier and Histogram Filtering

Table 5 shows the performances of the combined Vernier-Histogram Filtering method for the conditions. At each epoch, different set of random noise is generated with an amplitude which is 15 times stronger than the amplitude of signal, corresponding to an SNR of −23.5 dB. Ten carrier peaks are selected for each case, and the numbers 48-66 are arbitrarily assigned values when real intersect does not exist. The final error with the highest probability is 0 for all the ten epochs, implying the potential for high accuracy of the proposed Vernier-Histogram method.

TABLE 5

Results of the Vernier - Histogram filtering.

| Epoch | Intersect (ns) | Error (ns) |
| --- | --- | --- |
| 1 | 48, 50, 52, 54, 56, 0, 58, 0, 60, 62 | 0.0 |
| 2 | 48, 50, 0, 0, 52, 54, 56, 58, 60, 0 | 0.0 |
| 3 | 48, 0, 50, 52, 54, 56, 58, 60, 62, 64 | 0.0 |
| 4 | 48, 0, 50, 52, 0, 54, 10, 56, 58, −100 | 0.0 |
| 5 | 48, 50, 52, 0, 0, 54, 56, −100, 58, 60 | 0.0 |
| 6 | 0, 48, 50, 52, 54, 56, 58, 60, 62, 64 | 0.0 |
| 7 | 48, 50, 52, 10, 54, 56, 58, −1, 60, 0 | 0.0 |
| 8 | 0, 48, 50, 52, −100, 54, −1, 56, 58, 60 | 0.0 |
| 9 | 48, 50, 52, 54, 56, 58, 60, 62, 64, 66 | 0.0 |
| 10 | 48, 0, 50, −100, 52, 54, 0, 56, 58, 60 | 0.0 |

VI. Ambiguity in Pulse Repetition Interval (PRI, T)

T3R can estimate the desired time offset, "s" precisely but only within the range of the given pulse repetition period, "T", causing ambiguity in T. The desired time offset is given by:

$$t_T = m*T + s,$$

where $t_T$ is true time offset, s is the measured offset by T3R, and m is an integer, which is unknown, causing ambiguity. The period, T, is typically in the range of 10 ms –100 ms, depending on the signal propagation delays through the free space, the ionosphere and troposphere, and the latency caused by the hardware including the FPGA for time reversal and processing.

There are several means available to estimate the timing coarsely without relying on satellites. For example, WWV can provide timing to an accuracy of 10 ms-100 ms. Also the commercial low-cost watches can predict time with an accuracy on the order of 1 second. Therefore, it is necessary to find the unknown "m" among 100 (1 s/10 ms) potential bins only.

Our proposed solution to this ambiguity problem by finding the correct bin number m is to use the Vernier concept using two different periods, T. For example, from the two measurements using two periods, $T_1$ and $T_2$, one can obtain $$t_T = m_1 \times T_1 + s_1,$$

$$t_T = m_2 \times T_2 + s_2.$$

There are three unknowns ($t_T$, $m_1$, and $m_2$) but with only two equations. So the desired values cannot be found in general. However, $m_1$ and $m_2$ are integers within 1-100. So, by simply varying the m values and using the MatLab command "intersect", one can find the true offset.

The program below shows a simple example for finding $t_T$ for given values of $T_1=3$, $T_2=5$, $s_1=1$, $s_2=2$, with a restriction that m's are integers within the range of 1-10. The desired true values are found to be 7 and 22.

TABLE 6

A program to find the correct bin number using the Vernier method with two different pulse repetition periods T.

| | |
|---|---|
| mMax=10; | % max bin numbers |
| for m=1:mMax | |
|   y1(m)=3*m+1; | % T=3 and R=1 |
|   y2(m)=5*m+2; | % T=5 and R=2 |
| end | |
| % | |
| z=intersect(y1, y2) | |
| The output is | |
|   y1=4, 7, 10, 13, 16,   19, 22, 25, 28, 31, | |
|   y2=7, 12, 17, 22, 27,   32, 37, 42, 47, 52, | |
|   z =   7,   22 | |

The Free Temporal Range (FTR) described in the previous section applies here as well. By choosing a combination set ($T_1$ and $T_2$) properly, one can make the intersect to occur only once.

Once the correct bin number (as well as true offset value) is found at the initialization stage, the system can use the same number throughout the following measurements until the "s" escapes the T boundary, when the values can be incremented based on the trends, or a new initialization can be performed.

Time stamping to include longer scale ranges including minute, hour, day, year can also be done in a rather straightforward manner with about 20 bits. These information do not require frequent updates, so can be achieved easily without requiring a large amount of data. For example, one year is 60*24*365=5.26×10^5=2^19 sec, which requires less than 20 bits of digital data that do not require quick acquisition.

VII. Signal Blockage Due to Transmit/Receive Switching

In a T3R setup, both transmitter and receiver share the same antenna in order to preserve the reciprocity of the signal path. A switch behind the antenna alternates between transmit and receive mode. In this case, special care must be taken into account not to block signals. The blockage of the linear FM signal causes the loss in not only the signal strength but also the bandwidth of the received signal. As a result, the timing accuracy can be degraded due to the increase in the width of the main lobe of the correlation output.

Figure 16:
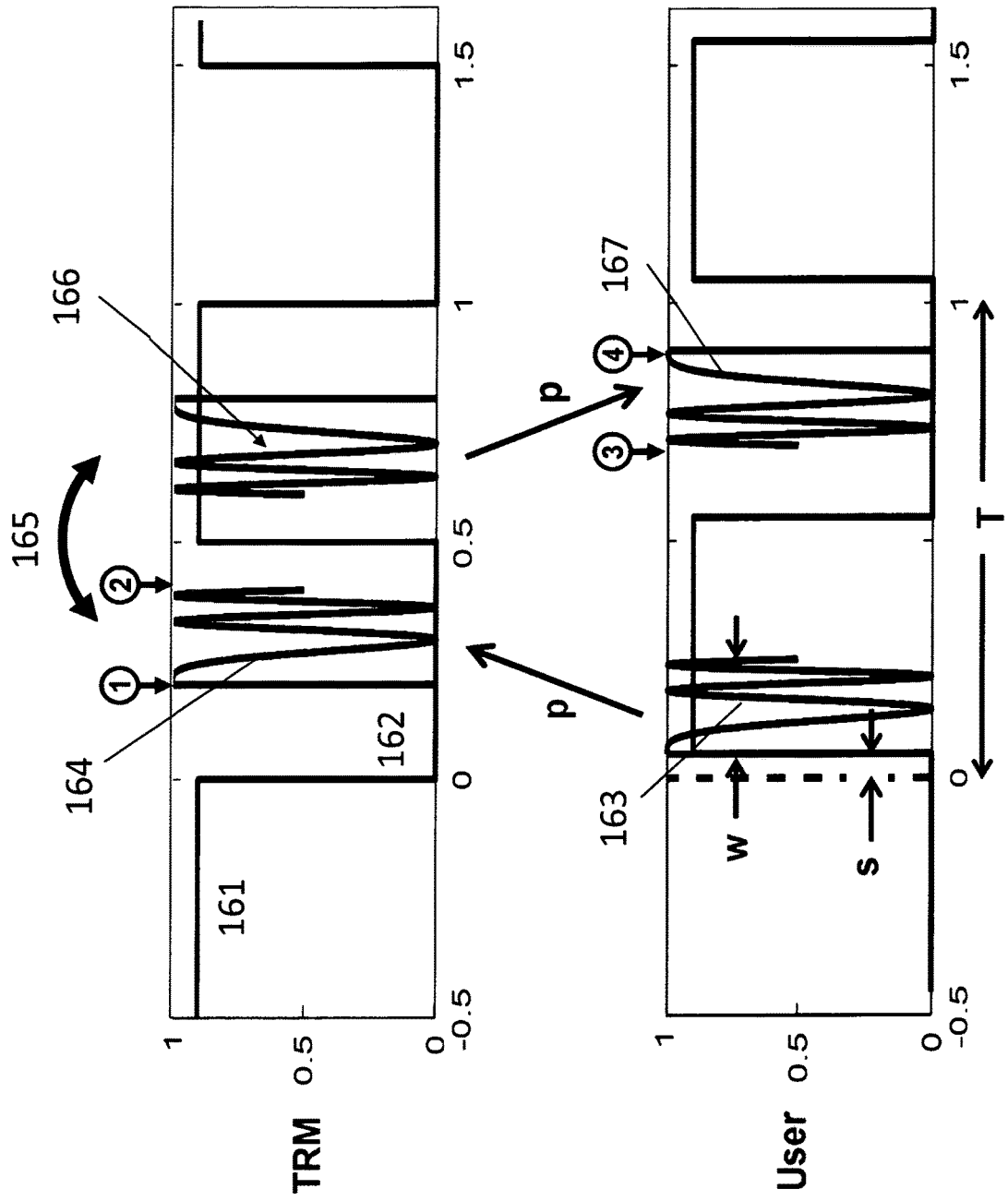
FIG. 16 explains the signal blockage due to T/R switching.

FIG. 16 shows the timing relationship at TRM and User nodes when time offset s=0.05, one-way propagation delay, p=0.15, pulse width, w=0.25, and period, T=1. In both nodes, signal is transmitted when control signal is high 161 and is received when the control signal is low 162.

At first, a pulse signal 163 is transmitted from User. The signal is then received by TRM after propagation delay p. The received signal 164 is time reversed 165 to 166 and is retransmitted back to User. Then User receives the returning signal 167 when control signal 162 is low.

FIG. 16. Signal Blockage Due to Transmit/Receive Switching

In order to avoid the signal blockage, the following four conditions must be satisfied.

$$t_1 = p + s > 0 \quad (1)$$

$$t_2 = p + s + w < 0.5 \cdot T \quad (2)$$

$$t_3 = T - 2s - w > 0.5 \cdot T \quad (3)$$

$$t_4 = T - 2s < T \quad (4)$$

The four parameters (p, w, s, and T) can be determined as follows:

Propagation delay, p, can be roughly estimated based on the ground distance and the ionospheric conditions (layers, hops, etc.)

Pulse width, w, must be determined after considering the desired processing gain, SNR, and accuracy, as well as the available hardware (e.g. sampling rate and memory depth)

Period, T, must be sufficiently large not to cause range ambiguity, and small enough not cause significant amount of latency. which can cause non-reciprocity.

Time offset, s, is what User must measure and minimize. It is a bipolar value (gain or lose). As will be explained below, it is highly desirable to reduce the value as much as possible during the coarse initialization stage, with the aid of WWV or through an iterative procedure with variable periods.

Requirement (1) appears to limit the operational range of s to s>-p. Also, the requirement (3) cannot be satisfied if s<0. This restriction can be obviated using the ambiguity feature of the control signal which repeats itself with a period T. The exact bin number can be found using the method proposed in Section 3.

If s is small, the restrictions on other parameters (w, p, T) can be greatly relaxed. Especially when s=0, the following condition guarantees to satisfy all the above four requirements and completely avoid the signal blockage.

$$p + w < T/2.$$

However, s=0 is the eventual goal of T3R and even to attain +−10% of the period is challenging. For example, when prf is 100 Hz, the period is 10 ms and its 10% is 1 ms, which cannot be easily achieved.

In this invention, we propose the variable period method. During the coarse initialization stage, one can increase the period long enough to avoid the range ambiguity and signal blockage. This longer period may increase the amount of latency and, as a result, non-reciprocity. However, one may tentatively ignore these secondary effects during the initialization stage. Through some iterative procedure, the amount of time offset may be gradually reduced to less than 10% of the period.

Once s becomes reasonably small, one can gradually reduce the period to avoid the undesirable secondary effects and obtain higher precision. Also, if necessary, User can add or subtract additional known fixed delay to its control signal which can be subtracted out later.

VIII. SNR Improvement by Stroboscopic Time-Domain Filtering

High frequency (HF) is susceptible to environmental noise, and so even after matched filtering and bandpass filtering, noise is still typically much (about 30-60 dB) stronger than signal, making its time-domain detection extremely difficult.

In this invention, we propose the stroboscopic time-domain filtering method. It is a highly efficient noise cancelation method that can cancel out even in-band noise. Similar concepts have been used in other applications, such as laser spectroscopy. However, to the best of our knowledge, it has not been used for direct time-domain detection of HF signals. The basic concept is briefly described in our publication [Paek et al, PTTI-43, Ref. 2] without any details.

In the following, we describe a detailed procedure and requirements to enable the stroboscopic time-domain filtering between remotely separated T3R nodes. Also, the effects of PRF and the number of averaging on the filtering efficiency of HF signals are described. Finally, the application of the unique in-band noise cancelation capability to cope with the noise due to hostile jamming or spoofing, will be proposed.

The stroboscopic time-domain filtering consists of three simple processes as:
Signal is synchronously repeated at a pre-defined PRF.
Noise is not synchronized to the PRF.
After averaging, noise becomes diminished, while signal is unaffected.

The detailed procedure to implement the filtering with remote nodes, the impacts of PRF and the number of averaging, and its application to anti-jamming will be described below.

VIII-1. The Procedure for the Stroboscopic Averaging

Figure 17:
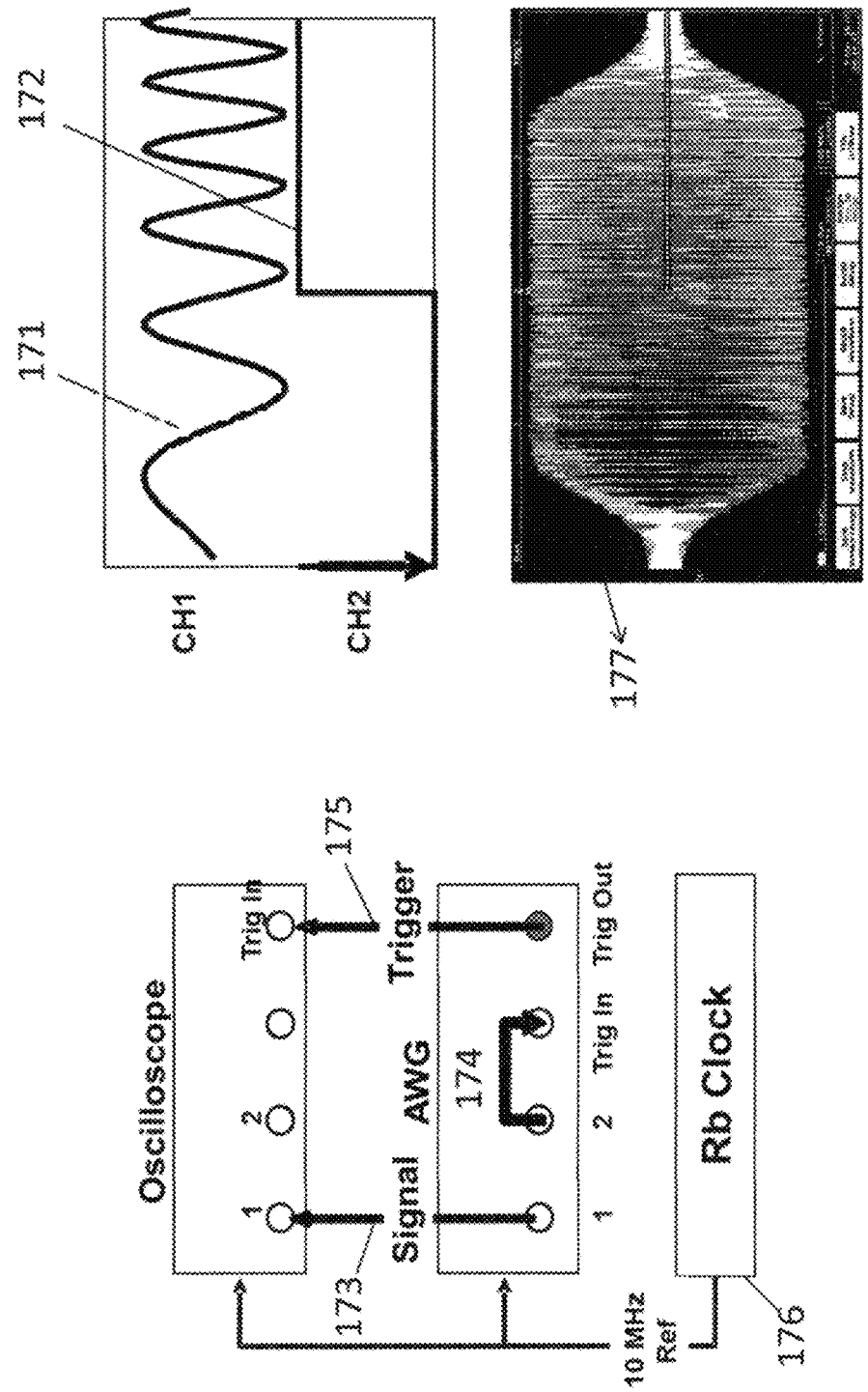
FIG. 17 is a schematic diagram of a practical setup for the stroboscopic filtering.

FIG. 17 shows the proposed method to maintain the phase relationship between signal and control signal at remote nodes.

FIG. 17. Stroboscopic Filtering Setup

To achieve the stroboscopic time-domain filtering, the main linear FM signal 171 must be synchronized precisely with the trigger signal 172 to ensure the same waveform at each epoch. Also, the master clock 176 and trigger signal 175 of the receiving oscilloscope must be synchronized with the incoming signal from a remote node. In order to meet the requirements, the following procedures using commercially available digital oscilloscope and a waveform generator are proposed:
a 10 MHz reference signal from a Rubidium clock 176 is used as an external reference source for both an oscilloscope and an arbitrary waveform generator (AWG).
Both main 171 and trigger signals 172 are generated by the same AWG at channel 1 and 2, respectively.
The trigger signal from CH 2 of the AWG is used to trigger the oscilloscope by feeding the CH 2 output into Trig-IN port of the AWG 174 and connecting its Trig_OUT signal to Trig-IN port of the oscilloscope 175.

It should be noted that the oscilloscope detects signal from a remote node instead of its own. Therefore, both remote clocks must be precisely synchronized. However, it turned out that this seemingly strict condition can be satisfied if both remote clocks satisfy the conditions described in Appendix A. A relatively low-cost (~$1.5K) Rubidium clock usually satisfies the requirement.

Some commercial digital oscilloscopes (for example, Tektronix Digital Phosphor Oscilloscope, Model DPO-4000 Series) have the averaging feature and satisfies our requirements.

Finally, the bulky instruments (oscilloscope and waveform generator) can be replaced by dedicated processors such as FPGA or DSP to make the system compact and portable.

VIII-2. The Impacts of PRF and the Number of Averaging on T3R Performance

HF noise is not necessarily random white. Some artificial noise have some definite carrier frequencies. These signals cannot be efficiently canceled out by the stroboscopic averaging. Therefore, the PRF must be carefully chosen so that any integer multiples do not fall into the spectrum of the noise.

Figure 18:
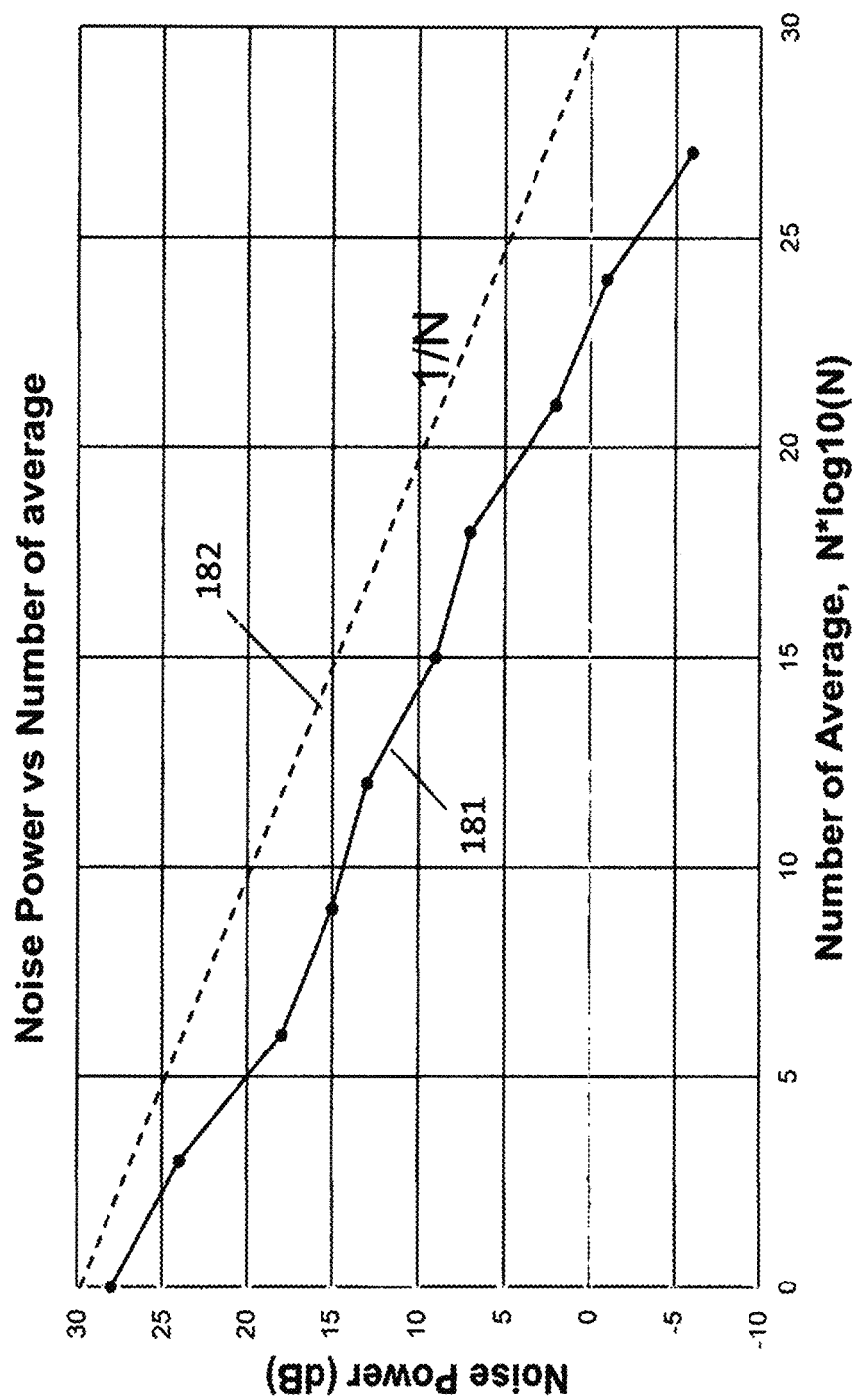
FIG. 18 illustrates noise power vs the number of average when PRF=127 Hz.

FIG. 18 shows an example of the measured HF noise power as a function of the number of average when pulse repetition frequency PRF=127 Hz, which is a prime number. As expected, noise power decreases as the number of average increases 181. However, in this case, noise drops even faster than 1/N, 182, probably because the environmental noise is not random white gaussian. The longer average requires more latency, resulting in degraded accuracy due to the non-reciprocity caused by the ionospheric drift. Therefore, it is important to carefully choose the trigger frequency, PRF, and the number of average, based on the experimental characterization and analyses.

FIG. 18. Noise Power Vs Number of Average when PRF=127 Hz

VIII-3. Application of the Stroboscopic Averaging for Anti-Jamming

As explained before, the proposed stroboscopic averaging method is very powerful in selectively canceling out noise, whether out-band or in-band. Even the same single frequency can be discriminated and selectively removed if they are not in synchronous with the agreed PRF. Therefore, it can be used for anti jamming or anti-spoofing, as will be explained again in Section 10.

IX. Day and Night Operations by Swept Frequencies

The ionospheric conditions and the resultant optimum frequencies vary fairly frequently. In general, optimum frequencies are higher in the daytime than at night. For example, in the Eastern North America, frequencies range usually 10-25 MHz in the day time and 4-10 MHz at night. When using the ionosphere, it is necessary to constantly monitor the status of the ionosphere. There are several tools, software, and web sites available. These include Reverse Beacon Network, VOACAP, hf-link, and several web sites provided by NOAA and NASA, etc. However, these existing tools are usually insufficient for real-time operation of T3R in terms of update speed, accuracy in locations, etc. For example, the ionosphere can change significantly during the typical update time of 15 minutes.

In this invention, we propose the swept frequency method. Instead of using the same frequency until the next update, several frequencies with high probability are repeatedly swept as below:

From: f1-f1-f1-f1-f1, f2-f2-f2-f2-f2, f3-f3-f3-f3-f3,
To: f1-f2-f3, f1-f2-f3, f1-f2-f3

The number of swept frequencies can be determined after considering the speed of the ionospheric drift and the processing power and memory size of the computer and hardware including FPGA. A computer with high speed GPU processors and parallel computing software tools are often required.

Also, the master clock used at each node must be reasonably stable to obviate the need for frequent correction. This can be systematically achieved using the well-known clock model or with the aid of feedback loop control to achieve both syntonization and synchronization. For example, a commercially available high-grade Cesium clock has a frequency accuracy of 5E-13. In this case, it takes almost one day for the clock to deviate by 50 ns. Therefore, several updates a day at good ionospheric condition may suffice.

X. Ionospheric Drift and Non-Reciprocity

The ionosphere moves fairly fast—typically about 100 m/s, and about 15 m/s along the vertical direction. It is very important to understand how the drift of the ionosphere affects the performance of T3R.

Figure 19:
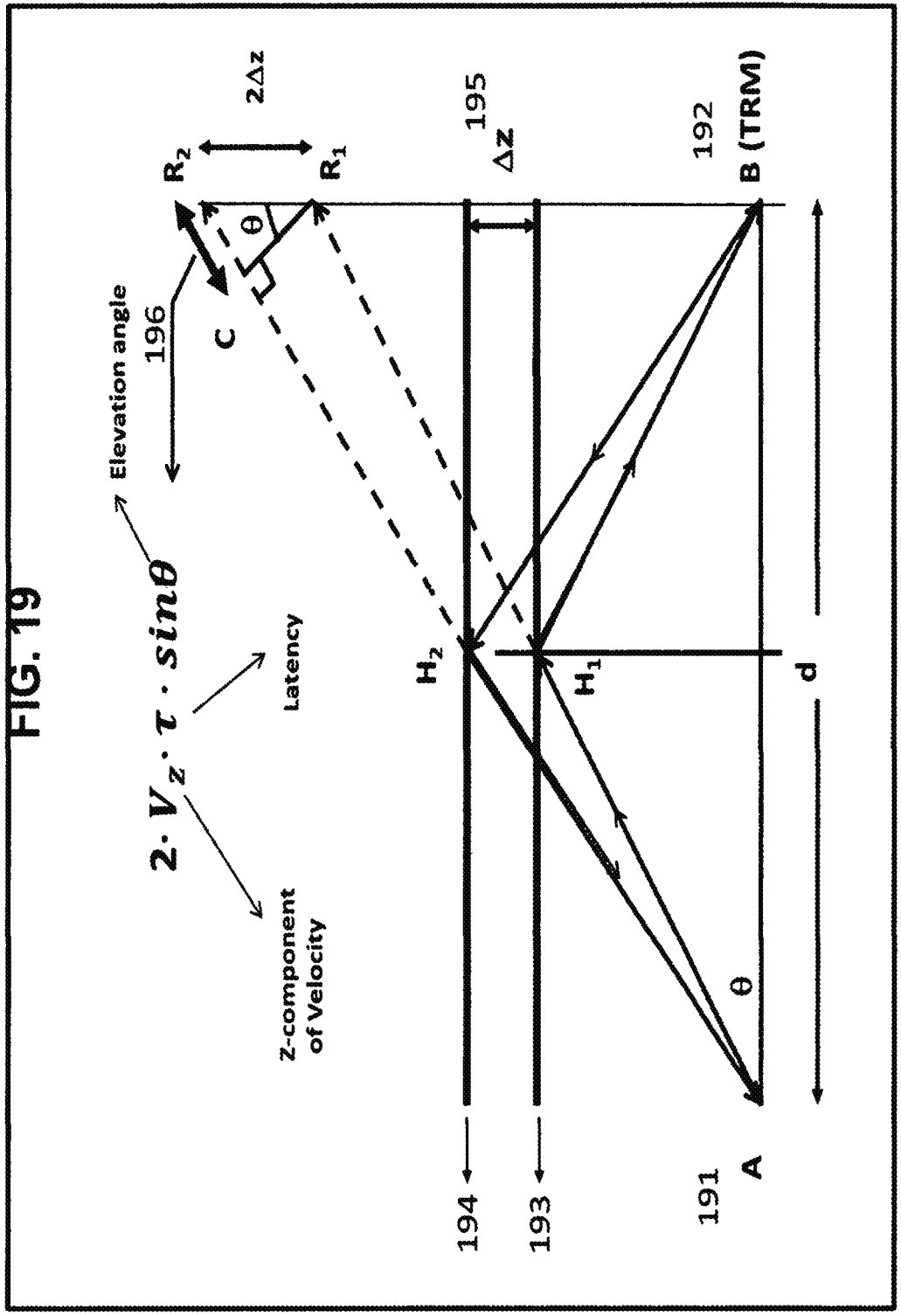
FIG. 19 estimates the amount of the ionospheric drift causing asymmetric paths.

FIG. 19. The Ionospheric Drift and Asymmetric Paths

In FIG. 19, the signal from user at A 191 is reflected (refracted more precisely) by the ionosphere 193 at H1 and reaches TRM 192. When the signal returns back to the ionosphere after time reversal, the ionosphere H1 has been moved to H2 194 by □z 195, creating an asymmetric path. The amount of the pathlength difference (PLD) between forward A-H1-B and backward B-H2-A propagation is given by $$PLD=2\times V_z\times\tau\times\sin(\theta),$$

where $\theta$ is the elevation angle of the antenna, $V_z$, is the vertical (z) component of the ionospheric velocity, $\tau$ is the latency time at TRM and propagation delay along H1-B-H2. R1 and R2 are the mirror images of B with respect to the reflecting surfaces 193 and 194, respectively. The desired PLD is approximately given by CR2, 196, which is given by the above equation. Plugging in some typical numbers for a long distance from California to Washington, D.C., d=3,700 km, H=500 km, sin θ=0.26, θ=15°, $V_z$=15 m/s, and τ=20 ms, the amount asymmetric pathlength becomes 2×15× 0.02×0.26 m=15.6 cm or 0.52 ns, which is much smaller than the accuracy of GPS.

If the amount of latency at TRM is long, e.g., 1 sec for stroboscopic averaging, the asymmetry becomes 26 ns, which is significant and so is not acceptable.

XI. Multiple Hops and Antenna Radiation Pattern

In the long-distance time transfer using the ionosphere, high frequency (HF) signals can hop more than once from the ionosphere and the ground. These multiple hops, in association with the antenna radiation pattern and pointing angle, affect the T3R performance.

FIG. 20. Multiple Hops and Antenna Radiation Pattern and Pointing

In FIG. 20, the effects of pointing directions and radiation patterns of antennas on the resultant timing signal are shown. The antenna on the user node 204 on the left points along either a single hop 206 or double hop 207 directions with a radiation pattern 204. The signal is then received by a TRM antenna on the right 205.

In the middle row from the top, forward (user to TRM) impulse response $h_F(t)$ 208 and backward (TRM to user) impulse response $h_B(t)$ 209 are shown.

At the bottom row, the final output 150, which is the correlation of forward and backward impulse responses are shown. For the purpose of brevity, time offset between the nodes are assumed to be 0. Three different cases are considered below:

a) Left column 201: If both user and TRM antennas point the same hop direction, forward and backward impulse responses are same (symmetric), and so the correlation peak, which appears at the difference between the two impulse responses, will appear at 0. As the ionosphere moves, these impulses will move but "together," and so the correlation peak 151 will be firmly fixed at 0.

b) Middle column 202: If the antennas point different directions, forward and backward impulse responses are different, and so the correlation peak will appear at non-zero location and keep moving as the ionosphere moves.

c) Right column 203: If both antennas are symmetrically oriented and beamwidths are broad enough to cover both hops, all signals via symmetric path will add up coherently at 0 (reference number 213), while the side peaks 214, 215 via asymmetric paths are weaker and keep moving.

XII. Avoiding Static Asymmetry Using Ionospheric Movement

Static asymmetry is generally difficult to detect and remove in conventional two-way systems and so pose the major error source in conventional two-way time transfer.

Specifically, people concern about the effectiveness of T3R in the ionosphere due to asymmetric transfer function of the antennas [Ref: 3], bifurcation of a signal in the ionosphere, etc.

Fortunately, in our T3R, the moving ionosphere "helps" identify the asymmetry with the aid of "p"-independence. The "p"-independence of T3R in the ionosphere is described previously [Ref 2] and is attached in Appendix B in this invention. Owing to the p-independence, it is easy to identify whether a returned signal is via symmetric or asymmetric path. The side peaks 154 and 155 of FIG. 20 obtained via asymmetric path are not stable due to the ionospheric drift. As a result, these false peaks can be identified and differentiated within several epochs, typically in less than a minute.

As explained in section VIII, we can easily and quickly (typically within ten epochs or pulses) tell whether a peak is true or not. If the ionosphere had not moved, these false peaks via asymmetric paths would have been stable too, making its identification difficult.

XIII. Anti-Jamming and Spoofing

Unlike GPS, T3R is not restricted to pre-defined frequencies, waveforms, and PRFs. One can vary to a different combination. This gives T3R a lot of flexibility to cope with hostile jamming or spoofing, In addition, the stroboscopic averaging method described in Section V has the ability to efficiently filter out undesired signals. Even the signal with the same in-band frequencies can be discriminated and filtered out, if not precisely synchronized in terms of pulse repetition period and phase.

Moreover, the nodes are separated at relatively short distances, compared with the GPS. Therefore, the propaga-

What is claimed as new and desired to be protected by Letters Patent of the United States is:

1. A High-Performance Time Transfer using Time Reversal (HP-T3R) method for time transfer accuracy of 10 ns or less over distances of 4,000 km or more via the ionosphere, without use of GPS or satellites, comprising:
   a) at a first node transmitting as an original signal a series of short pulses with a chirp waveform repeatedly at a period T,
   b) the signal propagating over a long path through the ionosphere, which consists of multiple layers, hops, and changes at a high speed,
   c) at a second node receiving the series of short pulses, processing the weak signal embedded in the strong high frequency (HF) noise, and time-reversing the waveform,
   d) retransmitting the series of time-reversed short pulses toward the first node through the ionosphere as a return signal,
   e) receiving the return signal at the first node,
   f) comparing the return signal with the original signal,
   g) computing a delay between the return signal and the original version that is equal to twice the time difference between the two nodes and applying the computed delay to a clock input calibration for a desired signal.

2. The method of claim 1 further comprising a vernier method applied to the highly dispersive and non-reciprocal ionospheric signals, the vernier method comprising:
   generation of extremely stable carrier phase against noise using unique propagation delay-independence and narrow bandwidth,
   using two or multiple carrier frequencies,
   reducing latency with a fast processor and tracking time near a true correlation peak,
   generating vernier scales from a correlation output using carrier peak detection, gap filling, and polynomial fitting,
   automatically finding the intersect of two scales,
   calibrating dispersion caused by the components in the asymmetric signal paths such as bandpass filters and amplifiers.

3. The method of claim 1 further comprising histogram filtering to automatically identify and filter out extraneous data, the histogram filtering comprising:
   using a linear FM waveform to generate a correlation output with a sine-shaped envelope with a peak at the desired true offset unlike the conventional carrier phase with uniform envelope that can cause the inherent integer ambiguity problem,
   establishing a statistical trend to generate a peak at the true peak with highest probability even in a noisy environment,
   identifying and removing extraneous data without having to know the origin of errors.

4. The method of claim 1 further comprising extending the timing range of T3R beyond the pulse repetition period by removing inherent ambiguity in T3R, the extending comprising:
   finding a bin number m from the measured offset value s by using two or more different pulse repetition intervals, T, where true time offset is given by $m1*T1+s1$ and $m2*T2+s2$,
   finding three unknown parameters from only two equations using an iterative procedure and a command intersect, with a consideration that m's are positive integers.

5. The method of claim 1 improving the signal-to-noise ratio (SNR) of the signals through the ionosphere or other noisy environments, the improving comprising:
   using linear FM and pulse compression to increase SNR,
   using a variable pulse repetition interval (PRI) to avoid the signal blockage due to transmit/receive switching,
   using stroboscopic time-domain filtering to remove in-band and out-of-band noise,
   using multiple swept frequencies to obtain consistent operations with ionospheric changes.

6. The method of claim 1 further comprising:
   eliminating unwanted time delays caused by optical pathlengths (p) and extracting desired time offset between nodes utilizing time reversal processing and a predefined pulse repetition period.

7. The method of claim 1 further comprising:
   discerning a true signal from false peaks due to the ionospheric multipaths using the unique p-independence feature of the T3R system.

8. The method of claim 1 further comprising:
   mitigating ionospheric non-reciprocity caused by ionospheric drift by minimizing the latency at a time reversal mirror by:
   quantitatively estimating the effects of the non-reciprocity caused by the ionospheric drift,
   minimizing the latency time at the time reversal mirror by using a fast processor.

9. The method of claim 1 further comprising:
   resolving static asymmetry in the ionosphere by:
   discerning a true peak from many false peaks caused by the ionospheric multipaths, using the p-independence of the T3R,
   identifying and eliminating the undesired effects of static asymmetry using ionospheric motion and the p-independence,
   resolving issues associated with the ionosphere, such as multiple hops and antenna pointing directions.

10. The method of claim 1 further comprising:
    preventing spoofing of the signals by:
    randomly choosing and varying the carrier frequency, pulse repetition frequency, and waveform from within the high frequency band.

11. A High-Performance Time Transfer using Time Reversal (HP-T3R) system through the ionosphere, comprising:
    a high-frequency (3-30 MHz) radio transceiver for ionospheric signals, including a high-gain antenna for transmitting as an original signal a series of short pulses repeatedly at a period T and for receiving from a remote node a return signal that is a retransmission of the original signal at the same period T,
    a clock circuit for inputting a clock signal to the transceiver, and
    a computer, including a machine-readable storage media having programmed instructions stored thereon for:
    computing and generating a linear FM signal,
    computing and generating a time-reversed signal version of the original signal,
    computing a delay between the return signal and the original version that is substantially equal to twice the time difference between the two n, and
    applying the computed delay to a clock input calibration for a desired signal.

12. The HP-T3R system of claim 11, wherein the transceiver comprises:
   a high-gain antenna and transceiver,
   a high-speed signal processor, such as field programmable gated array (FPGA) or DSP, for fast time reversal processing, waveform generation, correlation calculation, and data processing,
   a rubidium clock,
   a stroboscopic averaging circuit,
   a duplexer,
   a high-power amplifier,
   a low-noise amplifier, and
   a bandpass filter.

* * * * *